US012627178B2

(12) United States Patent
Ryu et al.

(10) Patent No.: US 12,627,178 B2
(45) Date of Patent: May 12, 2026

(54) ELECTRONIC DEVICE AND METHOD OF CONTROLLING WIRELESS CHARGING USING THE SAME

(71) Applicant: Samsung Electronics Co., Ltd., Suwon-si (KR)

(72) Inventors: Jisu Ryu, Suwon-si (KR); Sengtai Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 791 days.

(21) Appl. No.: 17/895,604

(22) Filed: Aug. 25, 2022

(65) Prior Publication Data

US 2023/0062165 A1    Mar. 2, 2023

Related U.S. Application Data

(63) Continuation of application No. PCT/KR2022/012518, filed on Aug. 22, 2022.

(30) Foreign Application Priority Data

Aug. 30, 2021    (KR) ........................ 10-2021-0114871

(51) Int. Cl.
*H02J 7/00*          (2006.01)
*H02J 50/10*         (2016.01)
(Continued)

(52) U.S. Cl.
CPC .......... *H02J 50/60* (2016.02); *H02J 7/00309* (2020.01); *H02J 7/0048* (2020.01); (Continued)

(58) Field of Classification Search
None
See application file for complete search history.

(56) References Cited

U.S. PATENT DOCUMENTS 8,994,326 B2    3/2015    Takada et al.
9,007,019 B2    4/2015    Ijima et al.
(Continued)

FOREIGN PATENT DOCUMENTS

JP          2013-135599 A          7/2013
KR      10-2014-0113147          9/2014
(Continued)

OTHER PUBLICATIONS

Korean Office Action dated Oct. 21, 2025, issued in a Korean Patent Application No. 10-2021-0114871.
(Continued)

*Primary Examiner* — Arun C Williams
(74) *Attorney, Agent, or Firm* — Jefferson IP Law, LLP

(57) ABSTRACT

An electronic device is provided. The electronic device includes a power receiver including a power receiving coil, a battery, and at least one processor operatively connected to the power receiver and the battery, wherein the at least one processor may be configured to identify whether a wireless charging protection mode has been entered, to wirelessly receive power in a first range from the power transmitting device through the power receiver when it is identified that a wireless charging protection mode has not been entered, to charge the battery using power in the first range, to identify a charge amount of the battery charged for a designated time, and to identify that a metallic foreign object exists, and to change the heat generation control condition in case it is identified that the charge amount of the battery is less than a designated value.

16 Claims, 10 Drawing Sheets

(51) Int. Cl.
    *H02J 50/60*         (2016.01)
    *H02J 50/80*         (2016.01)

(52) U.S. Cl.
    CPC ........ *H02J 7/007192* (2020.01); *H02J 50/10*
        (2016.02); *H02J 50/80* (2016.02)

(56)       References Cited

U.S. PATENT DOCUMENTS

| | | | |
|---|---|---|---|
| 9,423,439 B2 | 8/2016 | Jung et al. | |
| 9,929,605 B2 | 3/2018 | Nakano et al. | |
| 11,239,705 B2 | 2/2022 | Yang | |
| 2012/0119914 A1* | 5/2012 | Uchida | H02J 50/60 |
| | | | 307/104 |
| 2013/0063160 A1* | 3/2013 | Nakano | H02J 50/12 |
| | | | 324/653 |
| 2014/0266036 A1 | 9/2014 | Jung et al. | |
| 2014/0339891 A1* | 11/2014 | Ohkawa | H01M 10/44 |
| | | | 320/134 |
| 2015/0091387 A1* | 4/2015 | Okazaki | H02J 50/12 |
| | | | 307/104 |
| 2015/0171633 A1 | 6/2015 | Nakano et al. | |
| 2016/0020634 A1 | 1/2016 | Kanno | |
| 2018/0205257 A1 | 7/2018 | Kwon et al. | |
| 2018/0205269 A1 | 7/2018 | Han et al. | |
| 2021/0013749 A1 | 1/2021 | Louis | |
| 2021/0036554 A1 | 2/2021 | Kim et al. | |
| 2021/0124078 A1 | 4/2021 | Widmer et al. | |
| 2021/0399590 A1 | 12/2021 | Yun et al. | |
| 2022/0077722 A1 | 3/2022 | Seo et al. | |

FOREIGN PATENT DOCUMENTS

| | | |
|---|---|---|
| KR | 10-2015-0110794 A | 10/2015 |
| KR | 10-2017-0021011 | 2/2017 |
| KR | 10-2018-0083723 A | 7/2018 |
| KR | 10-2019-0036721 A | 4/2019 |
| KR | 10-2020-0041446 | 4/2020 |
| KR | 10-2020-0100976 | 8/2020 |
| KR | 10-2021-0015558 A | 2/2021 |
| WO | 2021/081382 | 4/2021 |

OTHER PUBLICATIONS

International Search Report dated Nov. 21, 2022, issued in International Patent Application No. PCT /KR2022/012518.

* cited by examiner

FIG. 1

ELECTRONIC DEVICE AND METHOD OF CONTROLLING WIRELESS CHARGING USING THE SAME

CROSS-REFERENCE TO RELATED APPLICATION(S)

This application is a continuation application, claiming priority under § 365(c), of an International application No. PCT/KR2022/012518, filed on Aug. 22, 2022, which is based on and claims the benefit of a Korean patent application number 10-2021-0114871, filed on Aug. 30, 2021, in the Korean Intellectual Property Office, the disclosure of which is incorporated by reference herein in its entirety.

TECHNICAL FIELD

The disclosure relates to an electronic device and a method of controlling wireless charging using the same. More particularly, the disclosure relates to an electronic device for identifying whether a metallic foreign object exists based on a charge amount of a charged battery using power wirelessly received from a power transmitting device for a designated time in a state in which a wireless charging protection mode does not operate.

BACKGROUND ART

Electronic devices may perform wireless charging or contactless charging using wireless power transfer technology. Wireless power transfer technology may be technology that charges a battery of the electronic device by wirelessly transferred power from a power transmitting device to an electronic device without connection by a separate connector between the electronic device (e.g., a power receiving device) and the power transmitting device (e.g., a wireless charger). In using wireless power transfer technology, the power transmitting device may function in a wireless charging protection mode for detection of a metallic foreign object. The wireless charging protection mode may be a mode of detecting a presence or absence of a metallic foreign object during wireless charging of the electronic device and preventing heat generation due to the metallic foreign object.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

However, when a wireless charging protection mode does not operate due to a presence of a metallic foreign object during wireless charging, the battery may be charged with normal charging power, and accordingly, thermal deformation may occur in a rear cover of the electronic device and/or an upper part of the power transmitting device.

An electronic device according to various embodiments of the disclosure may identify whether a metallic foreign object exists based on a charge amount of a charged battery using power wirelessly received from a power transmitting device for a designated time in a state in which a wireless charging protection mode does not operate. When a charge amount of the battery is less than a designated value, the electronic device may identify that a metallic foreign object exists and change a heat generation control condition.

Aspects of the disclosure are to address at least the above-mentioned problems and/or disadvantages and to provide at least the advantages described below.

Accordingly, an aspect of the disclosure is to provide an electronic device and a method of controlling wireless charging using the same.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a power receiver including a power receiving coil, a battery, and at least one processor operatively connected to the power receiver and the battery, wherein the at least one processor may be configured to identify whether a wireless charging protection mode has been entered, to wirelessly receive power in a first range from a power transmitting device through the power receiver when it is identified that a wireless charging protection mode has not been entered, to charge the battery using power in the first range, to identify a charge amount of the battery charged for a designated time, and to identify that a metallic foreign object exists and to change the heat generation control condition when it is identified that the charge amount of the battery is less than a designated value.

In accordance with another aspect of the disclosure, a method of controlling wireless charging of an electronic device is provided. The method includes identifying whether a wireless charging protection mode has been entered, receiving, when it is identified that a wireless charging protection mode has not been entered, wirelessly receiving power in a first range from a power transmitting device through a power receiver of the electronic device, charging the battery using power in the first range, identifying a charge amount of the battery charged for a designated time, and identifying that a metallic foreign object exists and changing a heat generation control condition, when it is identified that a charge amount of the battery is less than a designated value.

Advantageous Effects of Invention

An electronic device according to various embodiments of the disclosure can identify whether a metallic foreign object exists based on a charge amount of a battery charged for a designated time in a state in which a wireless charging protection mode does not operate, thereby preventing accidents due to a metallic foreign object.

An electronic device according to various embodiments of the disclosure can identify that a metallic foreign object exists when a charge amount of the battery is less than a designated value, and by charging the battery with low power by changing a heat generation control condition, it is possible to prevent thermal deformation that may occur in an upper part of a power transmitting device and/or a rear cover of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 is a block diagram illustrating an electronic device in a network environment according to an embodiment of the disclosure;

Throughout the drawings, it should be noted that like reference numbers are used to depict the same or similar elements, features, and structures.

MODE FOR THE INVENTION

Figure 2:
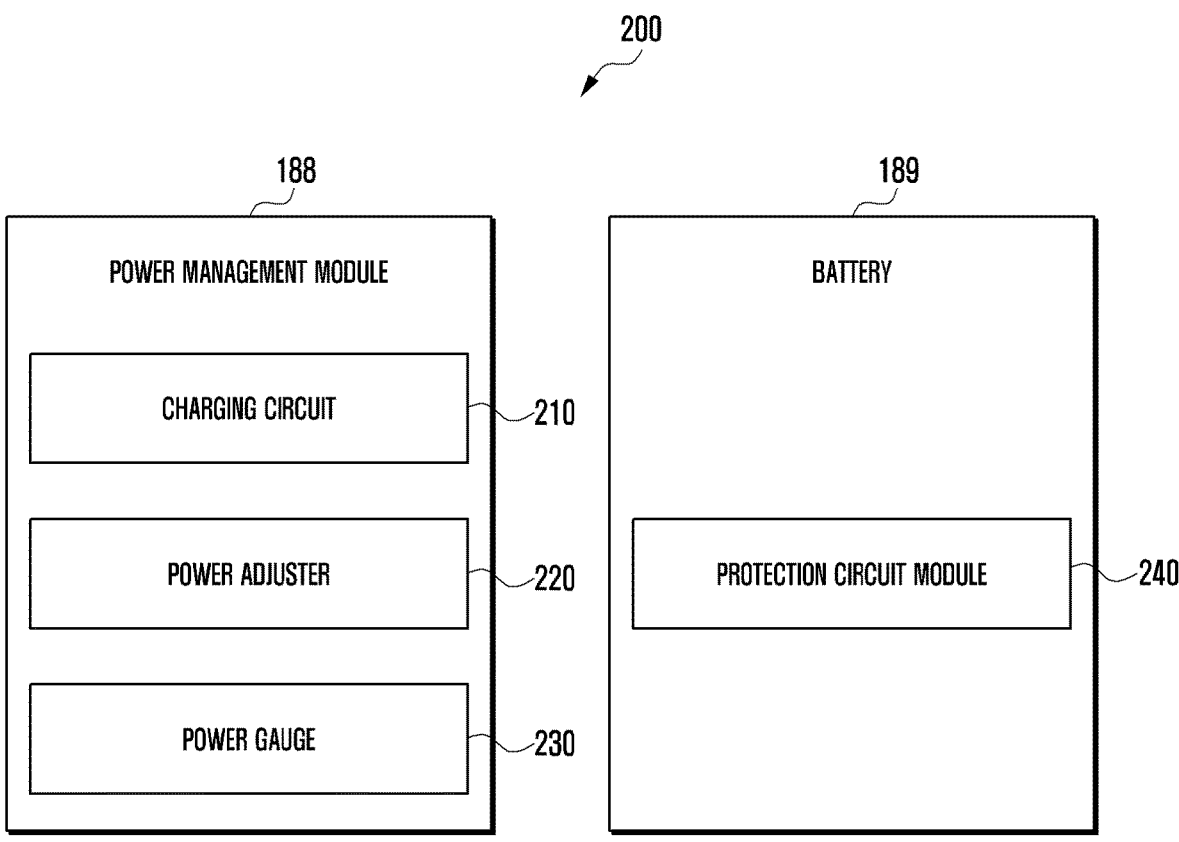
FIG. 2 is a block diagram illustrating a power management module and a battery according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
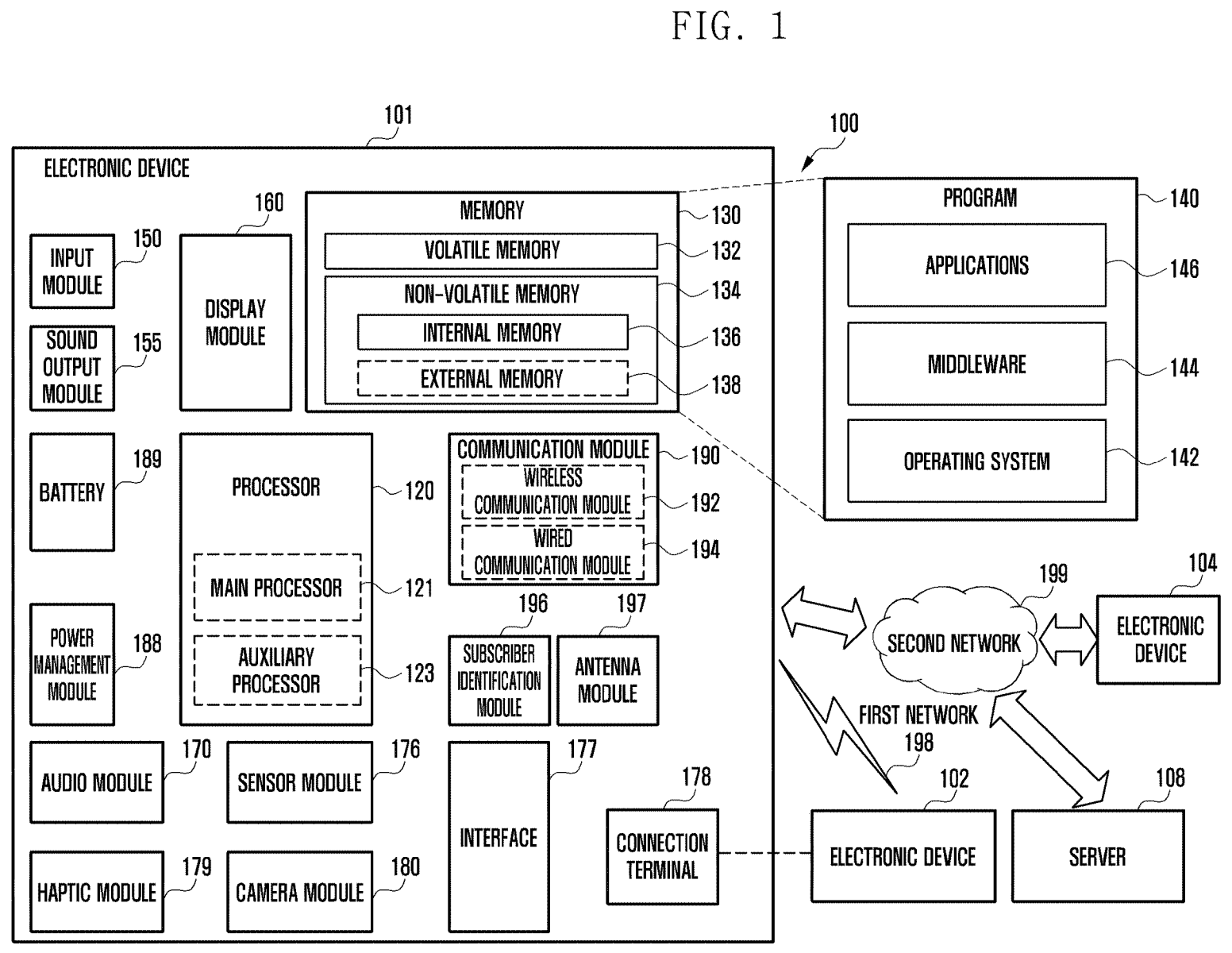

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connection terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., through wires) or wirelessly. According to an embodiment of the disclosure, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment of the disclosure, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mm Wave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form mmWave antenna module. According to an embodiment of the disclosure, the mm Wave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IOT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

FIG. 2 is a block diagram 200 illustrating a power management module and a battery according to an embodiment of the disclosure.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment of the disclosure, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment of the disclosure, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment of the disclosure, at least some of the functions of the power management module 188 may be performed by an external control device (e.g., the processor 120).

The battery 189, according to an embodiment of the disclosure, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment of the disclosure, at least part of the charging state information or use state information regarding the battery 189 may be measured using a corresponding sensor (e.g., a temperature sensor) of the sensor module 176, the power gauge 230, or the power management module 188. According to an embodiment of the disclosure, the corresponding sensor (e.g., a temperature sensor) of the sensor module 176 may be included as part of the PCM 240, or may be disposed near the battery 189 as a separate device.

Figure 3A:
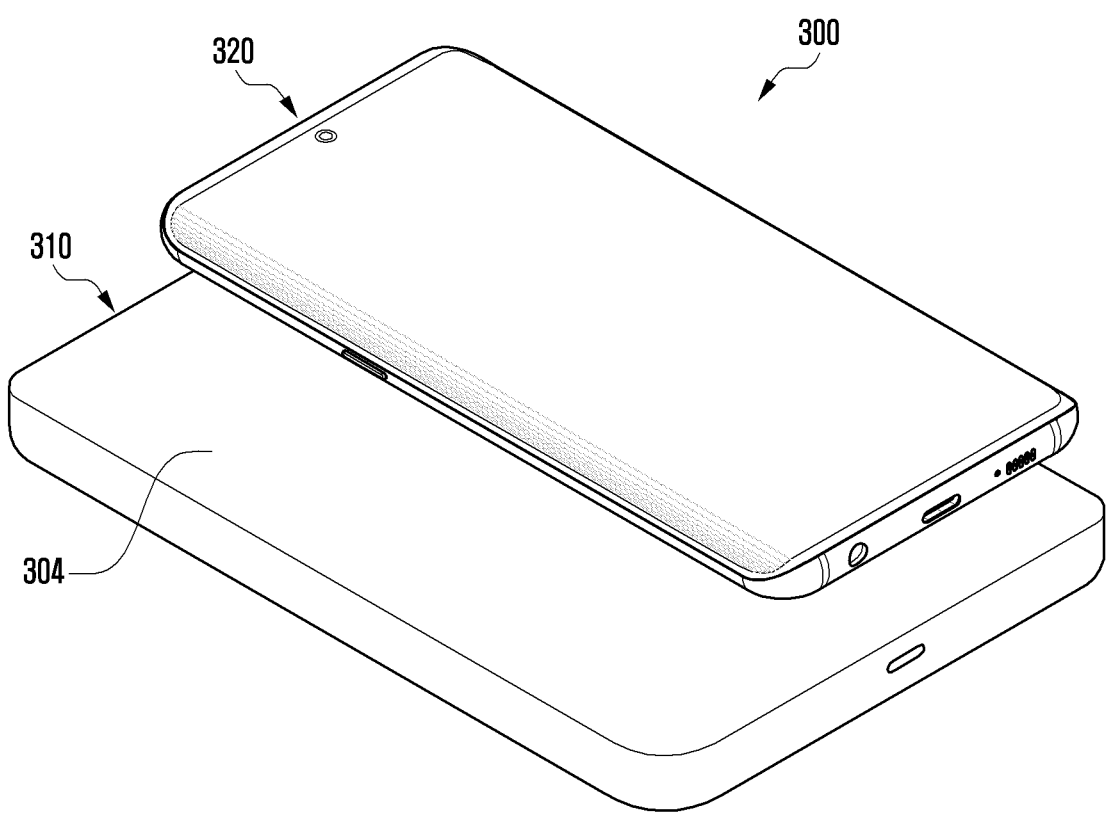
FIG. 3A is a diagram schematically illustrating an operation in which a power transmitting device charges a power receiving device according to an embodiment of the disclosure.

FIG. 3A is a diagram 300 schematically illustrating an operation in which a power transmission device charges an electronic device according to an embodiment of the disclosure.

Referring to FIG. 3A, a power transmission device 310 may wirelessly transmit power to charge an electronic device 320. For example, when the battery (e.g., battery 189 in FIG. 1) of the electronic device 320 is in a discharged state or has remaining power level less than a specified level, the power transmission device 310 may wirelessly transmit power to charge the battery 189 of the electronic device 320.

In various embodiments of the disclosure, the electronic device 320 of FIG. 3A may be the electronic device 101 shown in FIG. 1. The electronic device 320 may be a smartphone, a wearable device (e.g., watch), tablet, or a wireless earphone.

In various embodiments of the disclosure, the power transmission device 310 may be a device for wirelessly supplying power. For example, the device for supplying power wirelessly may be a device for supplying power wirelessly to the electronic device 320 using a conductive pattern, such as a wireless charging pad. In an embodiment of the disclosure, the power transmission device 310 connected to the electronic device 320 through a wireless interface include a wireless high voltage (HV) device (e.g., a device supporting adaptive fast charge (AFC) or quick charge (QC)). The power transmitter 310 may However, the disclosure is not limited thereto.

In various embodiments of the disclosure, while waiting to charge the electronic device 320, the power transmission device 310 may detect that the electronic device 320 is placed on (e.g., adjacent to or in contact with) the housing 304. For example, the upper portion of the housing 304 of the power transmission device 310, a surface adjacent to the coil (not shown) for wireless charging or a surface in the direction in which the magnetic force of the coil for wireless charging is transmitted.

In an embodiment of the disclosure, the power transmission device 310 may transmit a first ping signal (e.g., an analog ping signal, a Q ping signal, or a digital ping signal) through a coil for wireless charging periodically or at a specified time to the electronic device 320 to determine (e.g., identify) whether the electronic device 320 is adjacent to or in contact with the power transmission device 310. In response to the first ping signal from the power transmission device 310, the electronic device 320 may transmit a feedback signal (e.g., response signal, identification information, configuration information, and/or signal strength packet (SSP) signal) to the power transmission device 310. For example, the Q ping signal is a type of analog ping signal, and may be used to identify the degree of matching in the resonance point of the coil by detecting change in a signal applied to the coil of the power transmission device 310 (e.g., changes in current, voltage, and/or frequency).

In various embodiments of the disclosure, based on the first ping signal for determining whether the electronic device 320 is placed on the housing 304 of the power transmission device 310, the power transmission device 310 may determine whether an object (e.g., the electronic device 320, metal) is placed on the housing 304. For example, the power transmission device 310 may identify a change in electrical energy (e.g., current or voltage) measured when the first ping signal is transmitted, and may determine whether the electronic device 320 is placed (e.g., present) based on the identified change in electrical energy. Upon determining that the electronic device 320 is present, the power transmission device 310 may adjust at least some of a plurality of parameters related to the first ping signal.

Figure 3B:
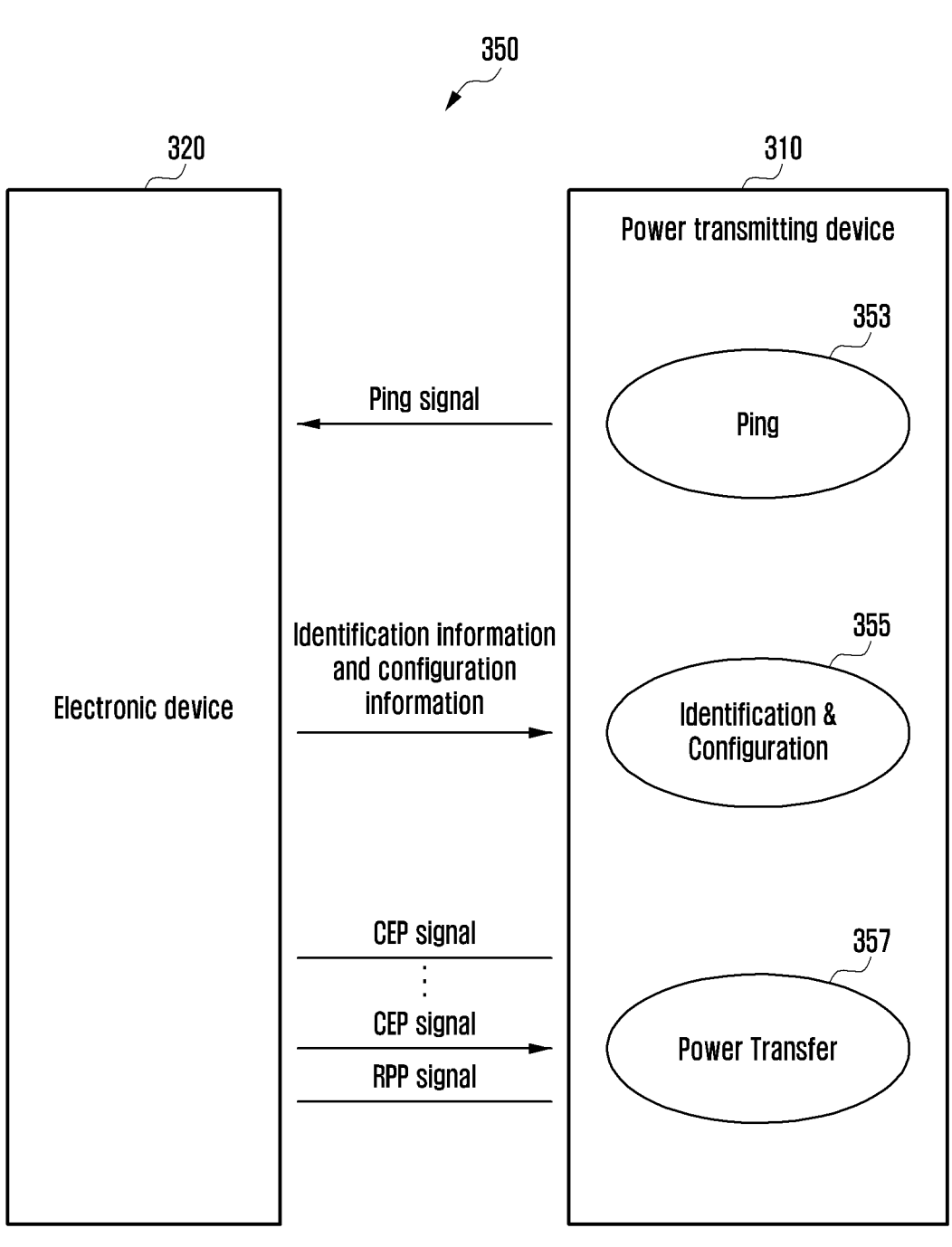
FIG. 3B is a diagram illustrating an operation in which a power transmitting device detects an object, such as a power receiving device according to an embodiment of the disclosure.

FIG. 3B is a diagram 350 illustrating an operation in which a power transmission device detects an object, such as an electronic device according to an embodiment of the disclosure.

Referring to FIG. 3B, the power transmission device 310 may perform a function (e.g., Tx function) of wirelessly transmitting power to the electronic device 320.

In various embodiments of the disclosure, for example, when the electronic device 320 is placed on the upper portion of the housing 304, the power transmission device 310 may detect and authenticate the electronic device 320 and wirelessly transmit power to the electronic device 320.

In an embodiment of the disclosure, the power transmission device 310 may perform ping operation 353, identification and configuration operation 355, and power transfer operation 357. The power transmission device 310 may utilize ping operation 353, identification and configuration operation 355, and power transfer operation 357 to transmit and receive signal or data.

In an embodiment of the disclosure, the power transmission device 310 may use ping operation 353 to transmit a signal (e.g., ping signal) for detecting the electronic device 320 within a preset range at preset time intervals. For example, the power transmission device 310 may transmit a first ping signal or a second ping signal to the electronic device 320. The transmission period of the first ping signal may be shorter than that of the second ping signal. The first ping signal may have a transmission period of about 0.1 to 10 ms. The second ping signal may have a transmission period of about 65 to 70 ms. The first ping signal may include an analog ping signal or a Q ping signal. The second ping signal may include a digital ping signal. The transmission period of the first ping signal and the transmission period of the second ping signal are illustrative, and may be changed according to settings of the power transmission device 310 and/or the user.

In an embodiment of the disclosure, the power transmission device 310 may receive a feedback signal (e.g., a response signal, identification information, configuration information, and/or SSP signal) from the electronic device 320 in response to the first ping signal or the second ping signal and may detect whether the electronic device 320 is present.

In various embodiments of the disclosure, the power transmission device 310 may use an analog ping signal serving as a first ping signal to determine whether a specific object (e.g., electronic device 320 or metallic object other than the electronic device) is placed on the upper portion of the housing 304. The power transmission device 310 may detect, for example, a change in current at the power generation circuit which may vary according to the type and location of the object.

In various embodiments of the disclosure, the power transmission device 310 may use a Q ping signal serving as a first ping signal to determine (e.g., identify) whether a specific object (e.g., electronic device 320 or metallic object other than the electronic device) is placed on the upper portion of the housing 304. The power transmission device 310 may detect, for example, changes in attenuation coefficient (e.g., a Q value) and natural frequency at the power transmission coil which may vary according to the type and location of the object.

In various embodiments of the disclosure, upon determining that a specific object (e.g., the electronic device 320) is placed on the upper portion of the housing 304 using the first ping signal, the power transmission device 310 may determine (e.g., identify) the type and location of the object placed on the upper portion of the housing 304 by using a digital ping signal serving as a second ping signal. For example, when the power transmission device 310 transmits a digital ping signal serving as a second ping signal to the electronic device 320, a voltage higher than a given value may be induced across the rectifying circuit of the electronic device 320, and a signal strength packet (SSP) signal indicating the magnitude of the induced voltage (e.g., information on the voltage value) may be transmitted to the power transmission device 310. The power transmission device 310 may identify the type and location of the electronic device 320 placed on the housing 304 based on the received SSP signal. In various embodiments of the disclosure, power transmission device 310 may receive a packet (e.g., a control error packet, CEP) related to wireless charging power control from the electronic device 320. The power transmission coil of the power transmission device 310 may include a plurality of coils, and may receive a packet using at least one coil among the plurality of coils. Power transmission device 310 may determine the location of the electronic device 320 based on the received packet and select at least one coil for wireless power transmission.

In an embodiment of the disclosure, the power transmission device 310 may configure a plurality of parameters related to transmission of the first ping signal or the second ping signal at ping operation 353. For example, the power transmission device 310 may configure a plurality of parameters related to the frequency of the first ping signal or the second ping signal, the voltage applied to the power transmission circuit (e.g., a power transmitter (not shown) or power transmission coil (not shown)) to transmit the first ping signal or the second ping signal, the transmission period of the first ping signal or the second ping signal, or the like. The plurality of parameters may be configured by the manufacturer of the power transmission device 310 and be given as default values at the initial configuration of the power transmission device 310.

In an embodiment of the disclosure, the power transmission device 310 may determine whether a specific object (e.g., the electronic device 320) is present on the housing 304 of the power transmission device 310 at ping operation 353. The power transmission device 310 may transmit a ping signal based on the plurality of parameters related to transmission of the first ping signal or the second ping signal during an interval for ping operation 353 (otherwise may be known as the wireless charging standby state), and may determine (e.g., identify) the electrical energy (e.g., at least one of current or voltage) measured at the power transmission circuit (e.g., the power transmitter (not shown) or power transmission coil (not shown)) in response to transmission of the ping signal.

In an embodiment of the disclosure, the power transmission device 310 may determine (e.g., identify) the relationship between the voltage measured across the power transmission circuit (e.g., the power transmitter (not shown) or power transmission coil (not shown)) and a specified threshold voltage, or the relationship between the current measured at the power transmission circuit (e.g., the power transmitter (not shown) or power transmission coil (not shown)) and a specified threshold current in response to transmission of the first ping signal or the second ping signal. The power transmission device 310 may then determine whether a specific object is present on the power transmission device 310 based on the result of the determination.

In an embodiment of the disclosure, the power transmission device 310 may detect the state of an object present on the power transmission device 310 (e.g., a type, a size, or an arrangement of the object) or change in the state of the object based on change in electrical energy (e.g., at least one of current or voltage) measured at the power transmission circuit (e.g., the power transmitter (not shown) or power transmission coil (not shown)) in response to transmission of the first ping signal or the second ping signal.

In an embodiment of the disclosure, upon determining that a specific object (e.g., the electronic device 320 or metallic object other than the electronic device) is placed on the housing 304 of the power transmission device 310, the power transmission device 310 may change or adjust at least some of the plurality of parameters related to transmission of the first ping signal or the second ping signal so as to suppress the noise caused by the object (e.g., a vibration of the object and/or noise in the audible frequency band due to the vibration), heat generation of the object, or deterioration of the power transmission device 310 caused by the object (e.g., heat generation of the power transmission device 310 due to induction heating from the object). The power transmission device 310 may output a specified notification (e.g., light, vibration, and/or sound) to provide a notification regarding a presence of the specific object.

In an embodiment of the disclosure, upon detecting the electronic device 320 (e.g., the wireless charging receiver), at identification and configuration operation 355, may receive identification information and configuration information of the electronic device 320.

In various embodiments of the disclosure, the identification information may include at least one piece of information capable of identifying the electronic device 320 (e.g., the wireless communication identification (ID) of the electronic device 320). If the identification information matches information previously stored in the memory (e.g., the memory 130 in FIG. 1) (e.g., the wireless communication ID of the electronic device 320 allowed to wirelessly share power with the power transmission device 310), the power transmission device 310 may determine the detected electronic device 320 to be a valid device. The configuration information may include various types of information required for the electronic device 320 to wirelessly receive power from the power transmission device 310.

In an embodiment of the disclosure, when the electronic device 320 is identified or selected based on the identification information and configuration information, at power transfer operation 357, the power transmission device 310 may wirelessly transmit power to the electronic device 320. At power transfer operation 357, the power transmission device 310 may receive, from the electronic device 320, control error packet (CEP) signal including notification information on the power (or the amount of power) required by the electronic device 320 for charging or received power packet (RPP) signal including magnitude information on the power (or the amount of power) received by the electronic device 320. The power transmission device 310 may adjust the power transmitted wirelessly to the electronic device 320 based on the CEP signal and/or the RPP signal.

In an embodiment of the disclosure, the electronic device 320 may transmit at least one CEP signal and RPP signal at specified periods or when a specific event (e.g., state change of the electronic device 320) occurs. Alternatively, the CEP signal and the RRP signal may be transmitted at different periods.

In various embodiments of the disclosure, when the power transmission device 310 includes a plurality of coils, the power transmission device 310 may perform ping operation 353, identification and configuration operation 355, and power transfer operation 357 through two or more coils among the plurality of coils.

In an embodiment of the disclosure, the power transmission device 310 may simultaneously perform the ping operation 353 through a plurality of coils or perform the ping operation 353 on a plurality of coils based on a specified pattern or order. When the electronic device 320 is detected through a plurality of coils, power transmission device 310 may perform the identification and configuration operation 355 through a coil that has detected the electronic device 320 or perform the identification and configuration operation 355 through a coil detected to be greater than or equal to a specified threshold value. In an embodiment of the disclosure, the power transmission device 310 may transmit power to the electronic device 320 through each of the plurality of coils in the power transfer operation 357, and receive feedback from the electronic device 320. In another embodiment of the disclosure, the power transmission device 310 may transmit power to the electronic device 320 through two or more of the plurality of coils in the power transfer operation 357, and receive feedback from the electronic device 320.

Figure 4:
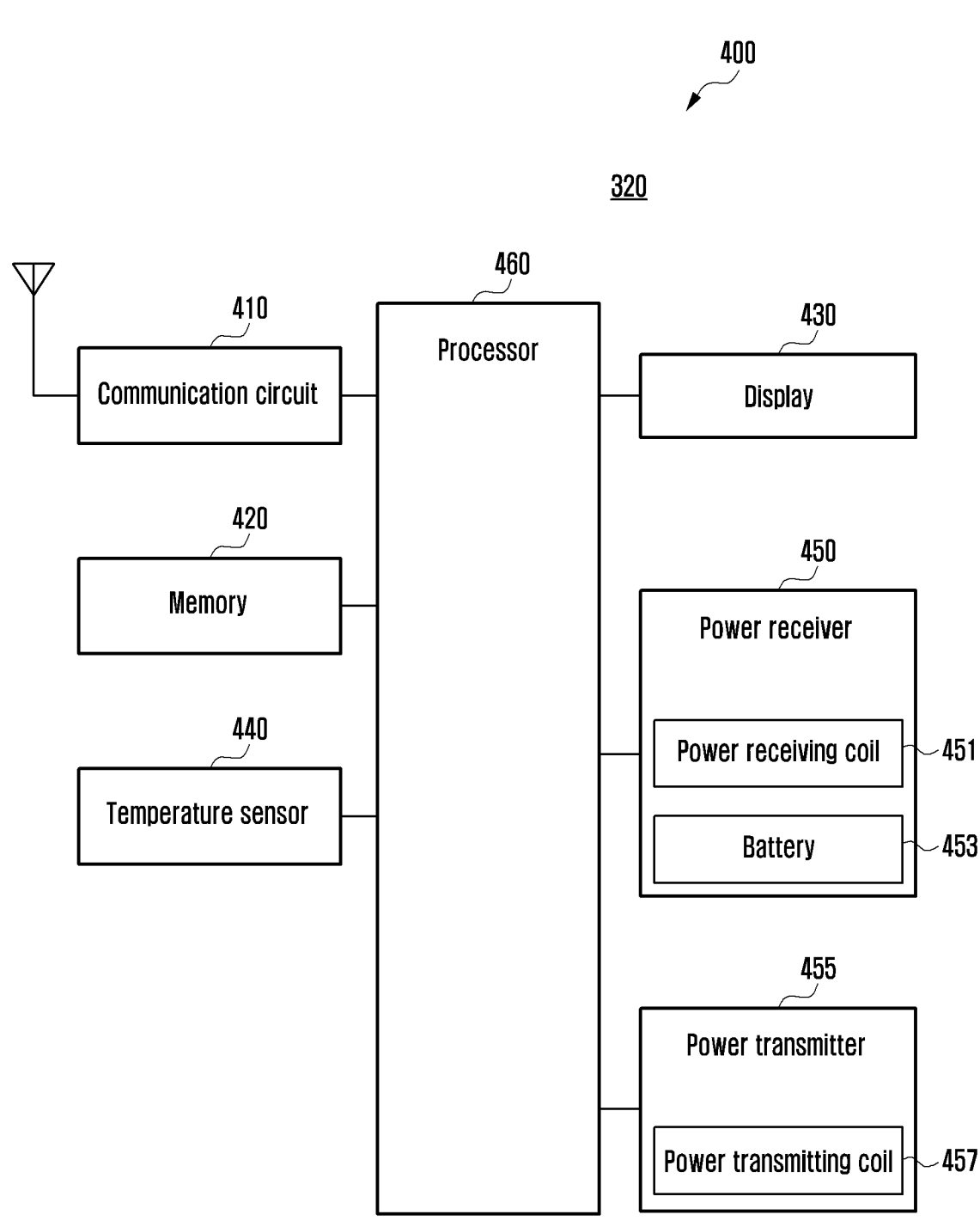
FIG. 4 is a block diagram illustrating an electronic device according to an embodiment of the disclosure.

FIG. 4 is a block diagram 400 illustrating an electronic device according to an embodiment of the disclosure.

Referring to FIG. 4, an electronic device (e.g., the electronic device 101 of FIG. 1 and the electronic device 320 of FIGS. 3A and 3B) may include a communication circuit 410 (e.g., the communication module 190 of FIG. 1), a memory 420 (e.g., the memory 130 of FIG. 1), a display 430 (e.g., the display module 160 of FIG. 1), a temperature sensor 440, a power receiver 450, a power transmitter 455, and/or a processor 460 (e.g., the processor 120 of FIG. 1).

In various embodiments of the disclosure, the communication circuit 410 (e.g., the communication module 190 of FIG. 1) may perform wireless communication with a power transmitting device (e.g., the power transmitting device 310 of FIGS. 3A and 3B). The communication circuit 410 may include at least one of a first communication circuit (not illustrated) or a second communication circuit (not illustrated). For example, the first communication circuit may communicate with the first communication circuit of the power transmitting device 310 using a power receiving coil 451. As another example, the first communication circuit may communicate with a first communication circuit of an external electronic device (e.g., the power receiving device) using a power transmission coil 457. The second communication circuit may communicate with a second communication circuit of the power transmitting device 310 (or external electronic device (e.g., the power receiving device)) using at least one of Bluetooth, Bluetooth low energy (BLE), Wi-Fi, or near field communication (NFC).

In various embodiments of the disclosure, the memory 420 (e.g., the memory 130 of FIG. 1) may perform a function of storing a program (e.g., the program 140 of FIG. 1) for processing and controlling a processor 460 of the electronic device 320, an operating system (OS) (e.g., the operating system 142 of FIG. 1), various applications, and/or input/output data and store a program of controlling the overall operation of the electronic device 320. The memory 420 may store various configuration information required upon processing functions related to various embodiments of the disclosure in the electronic device 320.

In an embodiment of the disclosure, the memory 420 may store a reference value (e.g., a designated ratio value for comparison with a ratio of an amount of power output transmitted by the power transmitting device 310 and an amount of power received by the electronic device 320) for identifying whether a wireless charging protection mode has been entered. The memory 420 may store a reference value (e.g., a designated value for comparison with a charge amount of a battery 453) for changing a heat generation control condition. The memory 420 may store a reference value (e.g., a designated temperature value) for entering a heat generation control mode.

In various embodiments of the disclosure, the display 430 (e.g., the display module 160 of FIG. 1) may display an image under the control of the processor 460 and be implemented in any one of a liquid crystal display (LCD), a light-emitting diode (LED) display, an organic light-emitting diode (OLED) display, a micro electro mechanical systems (MEMS) display, an electronic paper display, or a flexible display. However, the disclosure is not limited thereto.

In an embodiment of the disclosure, the display 430 may display various information related to wireless power reception and/or wireless charging of the electronic device 320 through a user interface under the control of the processor 460. For example, the user interface may include a user interface on a charge state of the electronic device 320 and a user interface on a state in which the electronic device 320 is disposed in a non-aligned manner in an upper part of the power transmitting device 310 (e.g., an upper part of the housing 304 of FIG. 3A).

In various embodiments of the disclosure, the temperature sensor 440 may measure a temperature of the power receiving coil 451 and transfer the measured temperature of the power receiving coil 451 to the processor 460.

In various embodiments of the disclosure, the power receiver 450 may include a battery 453 (e.g., the battery 189 of FIG. 1) and a power receiving coil 451 for wirelessly receiving power from the power transmitting device 310 (e.g., power transmitting coil). The disclosure is not limited thereto, and although not illustrated, the power receiver 450 may further include a matching circuit, a rectifying circuit for rectifying received AC power to DC, an adjustment circuit for adjusting a charging voltage, and/or a switching circuit.

In an embodiment of the disclosure, the processor 460 may charge the battery 453 using power wirelessly received from the power transmitting device 310 through the power receiving coil 451 of the power receiver 450.

In an embodiment of the disclosure, the battery 453 may be mounted in a housing (not illustrated) of the electronic device 320 and be rechargeable. The battery 453 may include, for example, a lithium-ion battery, a rechargeable battery, and/or a solar battery.

In various embodiments of the disclosure, the power transmitter 455 may include a power transmitting coil 457 for wirelessly transmitting power to an external electronic device (e.g., a power receiving device). The disclosure is not limited thereto, and although not illustrated, the power transmitter 455 may further include a power adapter for converting a voltage of power input from an external power source (e.g., travel adapter (TA)), a power generating circuit for generating power required for power transmission from a converted voltage, and/or a matching circuit for improving efficiency between the power transmitting coil 457 and a power receiving coil of an external electronic device (e.g., the power receiving device).

In various embodiments of the disclosure, the power receiver 450 and the power transmitter 455 may be formed in one module.

In various embodiments of the disclosure, the processor 460 (e.g., the processor 120 of FIG. 1) may include, for example, a micro controller unit (MCU) and control a plurality of hardware components connected to the processor 460 by driving an operating system (OS) or an embedded software program. The processor 460 may control, for example, a plurality of hardware components according to instructions (e.g., the program 140 of FIG. 1) stored in the memory 420.

In an embodiment of the disclosure, the processor 460 may identify whether a wireless charging protection mode has been entered based on the electronic device 320 being mounted in an upper part of the power transmitting device 310. For example, a wireless charging protection mode may be a mode to be performed to prevent the electronic device 320 and the power transmitting device 310 from being overheated by the metallic foreign object when a metallic foreign object exists in an upper part of the power transmitting device 310. For example, the power transmitting device 310 may determine whether the electronic device 320 is to enter a wireless charging protection mode based on whether a ratio of an amount of power received by the electronic device 320 to an amount of power output transmitted by the power transmitting device 310 exceeds a designated ratio value, and transmit a signal thereof to the electronic device 320. The processor 460 may or may not enter a wireless charging protection mode based on a signal on whether to enter a wireless charging protection mode received from the power transmitting device 310.

In an embodiment of the disclosure, when it is determined that a wireless charging protection mode has not been entered, the processor 460 may wirelessly receive power in a first range from the power transmitting device 310 through the power receiver 450. The processor 460 may charge the battery 453 using power in the first range and identify a charge amount of the battery 453 (e.g., a capacity (e.g., state of charge (SOC) of the battery 453) charged for a designated time. When it is identified that a charge amount of the battery 453 is less than a designated value, the processor 460 may identify that a metallic foreign object exists and change a heat generation control condition related to a temperature of the power receiving coil 451. The heat generation control mode may refer to a mode of charging the battery 453 with power lower than designated power (e.g., power in a range lower than power in a designated range). For example, when a temperature of the power receiving coil 451 is configured to a first temperature as the heat generation control condition, if it is identified that a charge amount of the battery 453 identified for a designated time is less than a designated value, the processor 460 may change the heat generation control condition from the first temperature to a second temperature lower than the first temperature.

In an embodiment of the disclosure, the processor 460 may identify whether a temperature of the power receiving coil 451 measured using the temperature sensor 440 reaches a second temperature corresponding to the changed heat generation control condition. When it is identified that a temperature of the power receiving coil 451 has reached a second temperature corresponding to the changed heat generation control condition, the processor 460 may enter a heat generation control mode. For example, the electronic device 320 may transmit a signal requesting power in a second range lower than power in a first range to the power transmitting device 310. The processor 460 may charge the battery 453 using power in the second range wirelessly received from the power transmitting device 310 through the power receiver 450.

The electronic device 320 according to various embodiments may include a power receiver 450 including a power receiving coil 451, a battery 453, and a processor 460 connected operatively with the power receiver 450 and the battery 453, wherein the processor 460 may be configured to identify whether a wireless charging protection mode has been entered, to wirelessly receive power in a first range from the power transmitting device 310 through the power receiver 450 when it is identified that a wireless charging protection mode has not been entered, to charge the battery 453 using power in the first range, to identify a charge amount of the battery 453 charged for a designated time, to identify that a metallic foreign object exists, and to change a heat generation control condition when it is determined that the charge amount of the battery 453 is less than a designated value.

In various embodiments of the disclosure, the heat generation control condition may be related to a temperature of the power receiving coil 451.

In various embodiments of the disclosure, when a temperature of the power receiving coil 451 is configured to a first temperature as the heat generation control condition, if it is identified that the identified charge amount of the battery 453 is less than the designated value, the processor 460 may be configured to change the heat generation control condition from a first temperature to a second temperature lower than the first temperature.

The electronic device 320 according to various embodiments may further include a temperature sensor 440 disposed adjacent to the power receiving coil 451.

In various embodiments of the disclosure, when a temperature of the power receiving coil 451 measured through the temperature sensor 440 exceeds the second temperature, the processor 460 may be configured to transmit a signal for requesting power in a second range lower than power in the first range to the power transmitting device 310 and to charge the battery 453 using power in the second range wirelessly received from the power transmitting device 310 through the power receiver 450.

In various embodiments of the disclosure, while charging the battery 453 using power in the second range, when a temperature of the power receiving coil 451 measured through the temperature sensor 440 reaches a third temperature lower than the second temperature, the processor 460 may be configured to transmit a signal requesting power in a first range higher than power in the second range to the power transmitting device 310, and to charge the battery 453 using power in the first range wirelessly received from the power transmitting device 310 through the power receiver 450.

In various embodiments of the disclosure, the processor 460 may be configured to receive a signal for enabling to enter a wireless charging protection mode determined by the power transmitting device 310 from the power transmitting device 310 based on an output amount of power transmitted by the power transmitting device 310 and a reception amount of power received from the power transmitting device 310.

In various embodiments of the disclosure, the processor 460 may be configured to receive a signal for enabling to enter a wireless charging protection mode from the power transmitting device 310 and to block charging of the battery 453 by entering a wireless charging protection mode based on it being identified by the power transmitting device 310 that a ratio of the power reception amount to the power output amount is less than a designated ratio value.

In various embodiments of the disclosure, when a ratio of the power reception amount to the power output amount is less than the designated ratio value, the metallic foreign object may exist in an upper part of the power transmitting device 310.

In various embodiments of the disclosure, when the processor 460 does not receive a signal for enabling to enter a wireless charging protection mode from the power transmitting device 310, the processor 460 may be configured to wirelessly receive power in the first range from the power transmitting device 310 through the power receiver 450.

A case of not receiving a signal for enabling to enter the wireless charging protection mode from the power transmitting device 310 according to various embodiments may include a case of not receiving a signal for enabling to enter a wireless charging protection mode from the power transmitting device 310 based on it being identified by the power transmitting device 310 that a ratio of the power reception amount to the power output amount is greater than or equal to the designated ratio value.

In various embodiments of the disclosure, when a ratio of the power reception amount to the power output amount is equal to or greater than the designated ratio value, the metallic foreign object may not exist in an upper part of the power transmitting device 310.

A case of not receiving a signal for enabling to enter a wireless charging protection mode from the power transmitting device 310 according to various embodiments may include a case of not receiving a signal for enabling to enter a wireless charging protection mode from the power transmitting device 310, as a presence of the metallic foreign object is not recognized, but the metallic foreign object exists in an upper part of the power transmitting device 310 based on it being identified by the power transmitting device

310 that a ratio of the power reception amount to the power output amount is less than the designated ratio value.

Figure 5:
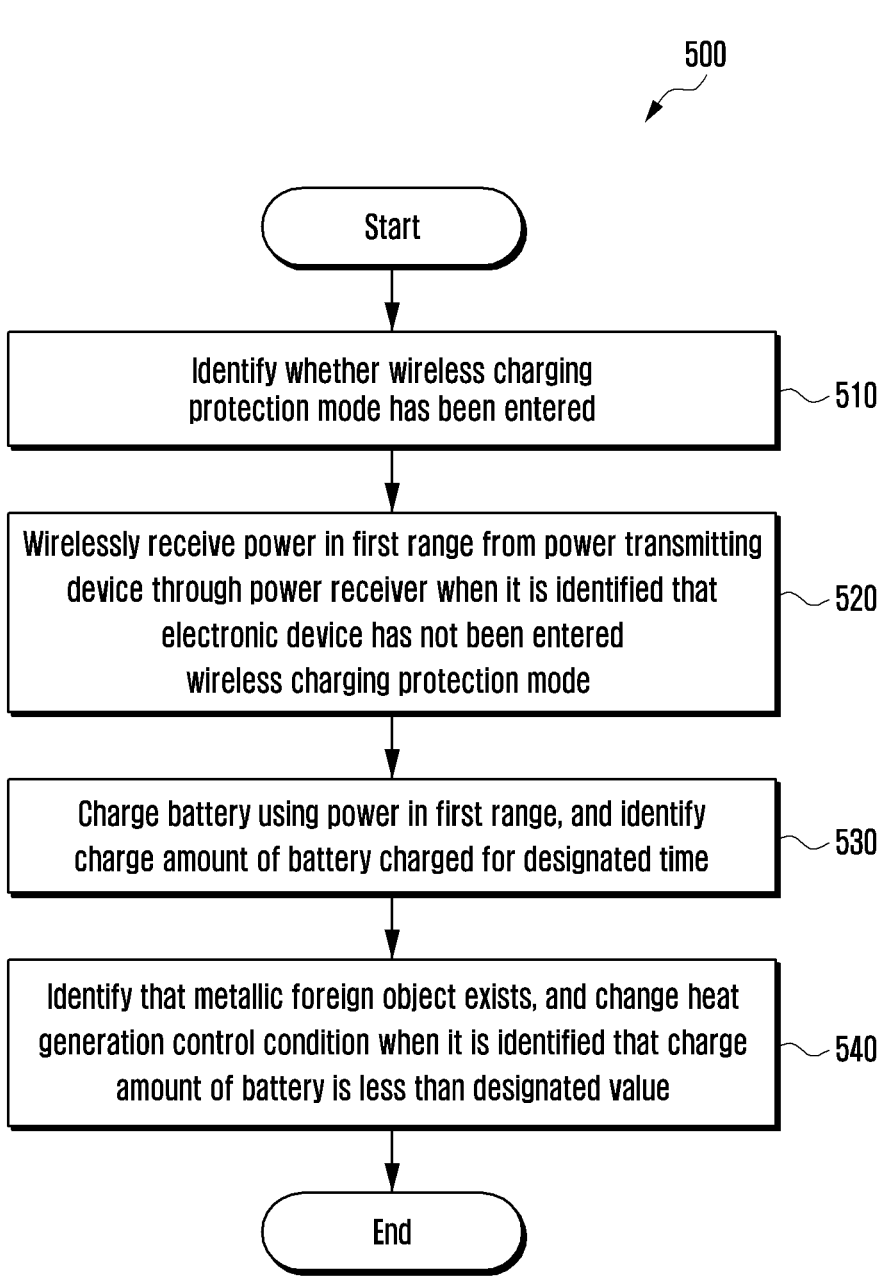
FIG. 5 is a flowchart illustrating a method of controlling wireless charging of an electronic device according to an embodiment of the disclosure.

FIG. 5 is a flowchart 500 illustrating a method of controlling wireless charging of an electronic device according to an embodiment of the disclosure.

Referring to FIG. 5, the electronic device (e.g., the electronic device 320 of FIGS. 3A and 3B) may identify whether a wireless charging protection mode has been entered in operation 510.

In various embodiments of the disclosure, a wireless charging protection mode may be a mode to be entered when a metallic foreign object exists in an upper part of the power transmitting device (e.g., the power transmitting device 310 of FIGS. 3A and 3B). For example, the electronic device 320 may transmit and receive information related to power to and from the power transmitting device 310. For example, the power transmitting device 310 may receive at least one control error packet (CEP) signal including notification information on power (or amount of power) required for charging of the electronic device 320, and transmit power determined based on at least one CEP signal to the electronic device 320. As another example, the power transmitting device 310 may receive a received power packet (RPP) signal including information on the magnitude of power (or amount of power) received by the electronic device 320 and transmit power determined based on the RPP signal to the electronic device 320.

In various embodiments of the disclosure, the power transmitting device 310 may compare information on the magnitude of power (e.g., power output amount) transmitted to the electronic device 320 through a power transmission coil (not illustrated) and information (e.g., power reception amount) on the magnitude of power received by the electronic device 320 included in an RPP signal received from the electronic device 320. The power transmitting device 310 may determine whether to enter the electronic device 320 in a wireless charging protection mode based on whether a ratio of a power reception amount to a power output amount exceeds a designated ratio value.

In an embodiment of the disclosure, if a ratio of the power reception amount to the power output amount is less than a designated ratio value, the power transmitting device 310 may transmit a signal for enabling the electronic device 320 to enter a wireless charging protection mode to the electronic device 320. When a ratio of a power reception amount to a power output amount is less than a designated ratio value, it may mean that a metallic foreign object exists in an upper part of the power transmitting device 310.

In an embodiment of the disclosure, when a ratio of a power reception amount to a power output amount is greater than or equal to a designated ratio value, the power transmitting device 310 may not transmit a signal for enabling the electronic device 320 to enter a wireless charging protection mode to the electronic device 320. When a power reception amount to a power output amount is equal to or greater than the designated ratio value, it may mean that a metallic foreign object does not exist in an upper part of the power transmitting device 310.

In various embodiments of the disclosure, when it is identified that a ratio of a power reception amount to a power output amount is less than a designated ratio value, the power transmitting device 310 may determine that a metallic foreign object exists in an upper part of the power transmitting device 310, and transmit a signal for enabling the electronic device 320 to enter a wireless charging protection mode to the electronic device 320. The electronic device 320 may enter a wireless charging protection mode based on the signal received from the power transmitting device 310. For example, the electronic device 320 may perform an operation blocking charging of the battery 453.

In an embodiment of the disclosure, when it is identified that the electronic device 320 has not been entered a wireless charging protection mode in operation 520, the electronic device 320 may wirelessly receive power in a first range from the power transmitting device 310 through the power receiver (e.g., the power receiver 450 of FIG. 4).

In an embodiment of the disclosure, when a ratio of a power reception amount to a power output amount is greater than or equal to a designated ratio value, the power transmitting device 310 may not transmit a signal for enabling the electronic device 320 to enter a wireless charging protection mode to the electronic device 320. Accordingly, the electronic device 320 may not enter a wireless charging protection mode.

In an embodiment of the disclosure, when it is identified that a ratio of a power reception amount to a power output amount is less than a designated ratio value, a metallic foreign object exists in an upper part of the power transmitting device 310, but the power transmitting device 310 may not transmit a signal for enabling the electronic device 320 to enter a wireless charging protection mode to the electronic device 320. For example, a case in which a metallic foreign object exists in an upper part of the power transmitting device 310, but in which the power transmitting device 310 does not transmit a signal for enabling the electronic device 320 to enter a wireless charging protection mode to the electronic device 320 may be a case in which the power transmitting device 310 is a device in which a foreign object detection (FOD) function is not implemented.

In an embodiment of the disclosure, as the power transmitting device 310 is a device in which an FOD function is not implemented, even though a metallic foreign object exists in an upper part of the power transmitting device 310, the power transmitting device 310 does not recognize a presence of the metallic foreign object and may not transmit a signal for enabling the electronic device 320 to enter a wireless charging protection mode to the electronic device 320. In this case, the electronic device 320 may charge the battery 453 using power in the first range received from the power transmitting device 310 without entering a wireless charging protection mode. Accordingly, thermal deformation may occur in a rear cover of the electronic device 320 and/or an upper part of the power transmitting device 310 in contact with the metallic foreign object due to heat generation of the metallic foreign object existing in an upper part of the power transmitting device 310.

In various embodiments of the disclosure, as a ratio of a power reception amount to a power output amount is less than a designated ratio value, a metallic foreign object exists in an upper part of the power transmitting device 310, but the metallic foreign object is not recognized, so that in order to prevent thermal deformation from occurring in the rear cover of the electronic device 320 and/or the upper part of the power transmitting device 310 in contact with the metallic foreign object due to heat generation of the metallic foreign object, the electronic device 320 may identify whether a metallic foreign object exists in the upper part of the power transmitting device 310 through operations 530 and 540 to be described later.

In an embodiment of the disclosure, in operation 530, the electronic device 320 may charge the battery 453 using power in the first range, and identify a charge amount of the battery 453 charged for a designated time. For example, the electronic device 320 may identify a charge amount of the battery 453 charged for a designated time from a time point at which the battery 453 is charged using power in the first range received from the power transmitting device 310. For example, the charge amount of the battery 453 may mean a capacity (e.g., a state of charge (SOC)) of the battery 453.

In an embodiment of the disclosure, in operation 540, when it is identified that the identified charge amount of the battery 453 is less than a designated value, the electronic device 320 may identify that a metallic foreign object exists, and change the heat generation control condition.

In various embodiments of the disclosure, a designated value, which is the comparison target of a charge amount of the battery 453 for determining whether a metallic foreign object exists may be configured to be smaller than a charge amount of the battery 453 charged for a designated time in a state in which the electronic device 320 is disposed in a non-aligned manner in an upper part of the power transmitting device 310. However, the disclosure is not limited thereto. In various embodiments of the disclosure, the designated value is configured to be smaller than a charge amount charged for a designated time in a state in which the electronic device 320 is disposed in a non-aligned manner in an upper part of the power transmitting device 310, and when the charge amount of the battery 453 is less than a designated value, as it is identified that a metallic foreign object exists, it is possible to more accurately identify whether the battery 453 is being charged in a state in which the electronic device 320 is disposed in a non-aligned manner in an upper part of the power transmitting device 310 or whether the battery 453 is being charged in a state in which the metallic foreign object exists.

In various embodiments of the disclosure, the heat generation control condition may be related to a temperature of the power receiving coil 451. For example, when the temperature of the power receiving coil 451 exceeds a designated temperature, the electronic device 320 may operate in a heat generation control mode. In an embodiment of the disclosure, the heat generation control mode may refer to a mode in that charges the battery 453 with power lower than designated power (e.g., power in a range lower than power in a designated range). For example, the designated temperature may be a temperature that may affect a charging operation due to over temperature of the battery 453 during a wireless charging operation. For example, the designated temperature may be about 41 degrees. However, the disclosure is not limited thereto.

In various embodiments of the disclosure, when a temperature of the power receiving coil 451 is configured to a first temperature (e.g., designated temperature) as a heat generation control condition, if it is identified that the identified charge amount of the battery 453 is less than a designated value, the electronic device 320 may change the heat generation control condition from a first temperature to a second temperature lower than the first temperature.

In various embodiments of the disclosure, the electronic device 320 may include a power receiving coil 451 or a temperature sensor (e.g., the temperature sensor 440 of FIG. 4) disposed adjacent to the power receiving coil 451. In one example, the electronic device 320 may measure a temperature of the power receiving coil 451 using the temperature sensor 440 at designated time intervals. The electronic device 320 may identify whether the measured temperature of the power receiving coil 451 reaches a second temperature corresponding to the changed heat generation control condition. When it is identified that a temperature of the power receiving coil 451 has reached a second temperature corresponding to the changed heat generation control condition, the electronic device 320 may enter a heat generation control mode. For example, the electronic device 320 may transmit a control error packet (CEP) signal including information requesting power (e.g., power in the second range) lower than power in the first range to the power transmitting device 310.

In various embodiments of the disclosure, the power transmitting device 310 may wirelessly transmit power (e.g., power in the second range) lower than power in the first range to the electronic device 320 based on receiving a CEP signal including information requesting power (e.g., power in the second range) lower than power in the first range from the electronic device 320. The electronic device 320 may charge the battery 453 using power (e.g., power in second range) lower than power in the first range wirelessly received from the power transmitting device 310 through the power receiver 450.

Figure 6:
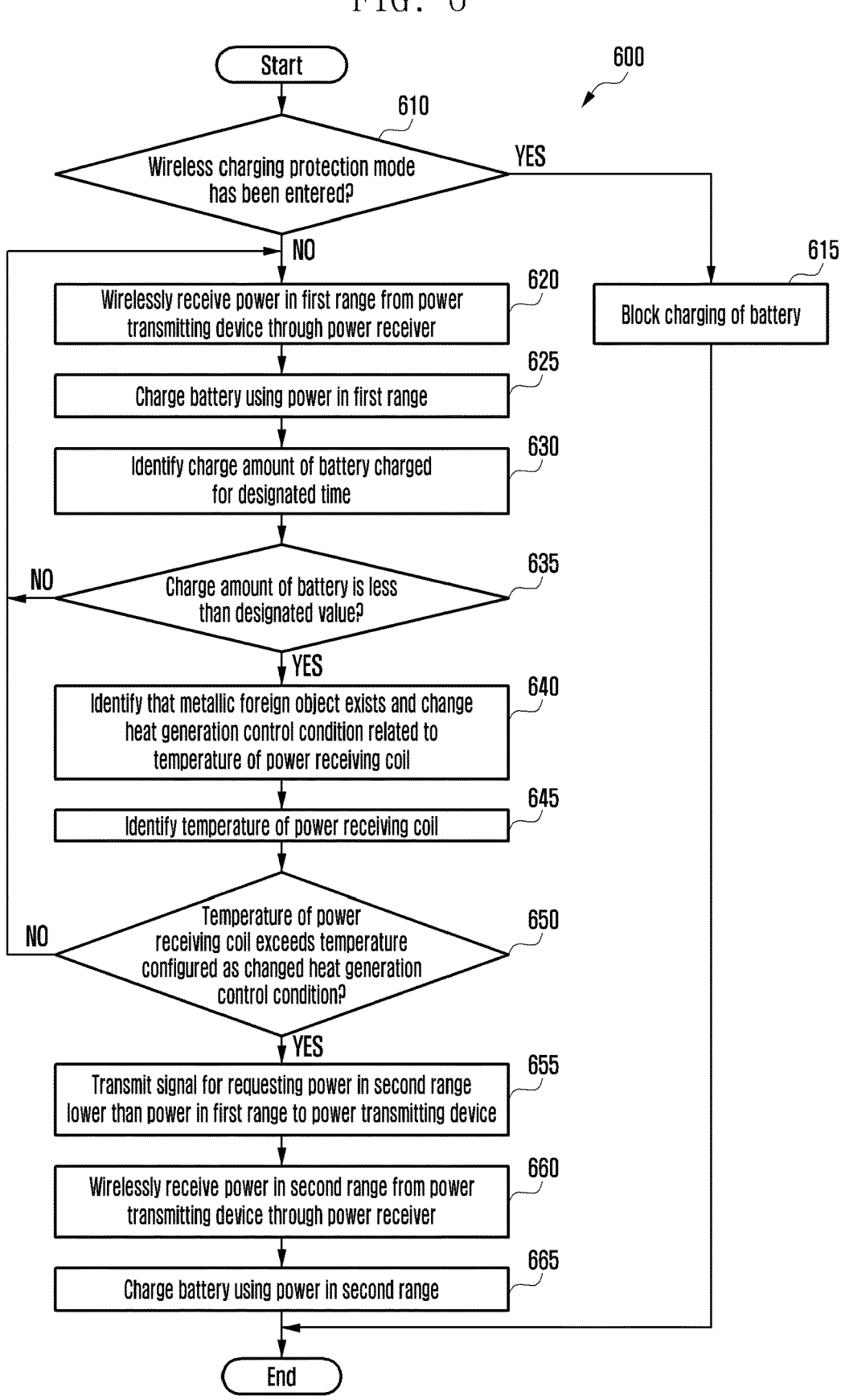
FIG. 6 is a flowchart illustrating a method of controlling wireless charging of an electronic device according to an embodiment of the disclosure.

FIG. 6 is a flowchart 600 illustrating a method of controlling wireless charging of an electronic device according to an embodiment of the disclosure.

FIG. 6 according to various embodiments is flowchart of the operations of FIG. 5 described above.

Referring to FIG. 6, the electronic device (e.g., the electronic device 320 of FIGS. 3A and 3B) may identify whether a wireless charging protection mode has been entered in operation 610. For example, a wireless charging protection mode may be a mode to be performed to prevent the electronic device 320 and the power transmitting device 310 from being overheated by a metallic foreign object when a metallic foreign object exists in an upper part of the power transmitting device 310.

For example, the power transmitting device 310 may compare magnitude information (e.g., power output amount) of power transmitted to the electronic device 320 through a power transmission coil (not illustrated) and magnitude information (e.g., power reception amount) of power received by the electronic device 320 included in an RPP signal received from the electronic device 320. The power transmitting device 310 may determine whether the electronic device 320 has been entered a wireless charging protection mode based on whether a ratio of a power reception amount to a power output amount exceeds a designated ratio value.

In an embodiment of the disclosure, if it is identified that a wireless charging protection mode has been entered (e.g., YES in operation 610), the electronic device 320 may block charging of the battery 453 in operation 615.

For example, if a ratio of the power reception amount to the power output amount is less than a designated ratio value, the power transmitting device 310 may identify that a metallic foreign object exists in an upper part of the power transmitting device 310, and transmit a signal for enabling the electronic device 320 to enter a wireless charging protection mode to the electronic device 320. The electronic device 320 may enter a wireless charging protection mode based on the signal received from the power transmitting device 310.

In various embodiments of the disclosure, after blocking charging of the battery 453, when receiving a signal for releasing a wireless charging protection mode from the power transmitting device 310, the electronic device 320 may perform an operation of charging the battery 453. For example, the power transmitting device 310 may transmit and receive a control error packet (CEP) and/or received power packet (RPP) signal(s) to and from the electronic device 320 at designated time intervals, and identify a ratio of a power reception amount to a power output amount based thereon. When it is identified that a ratio of a power reception amount to a power output amount is greater than or equal to a designated ratio value, the power transmitting device 310 may transmit a signal for releasing a wireless charging protection mode to the electronic device 320. The electronic device 320 may perform an operation of charging the battery 453 based on the signal for releasing a wireless charging protection mode received from the power transmitting device 310.

In an embodiment of the disclosure, if it is not identified that a wireless charging protection mode has been entered (e.g., NO in operation 610), the electronic device 320 may wirelessly receive power in the first range from the power transmitting device 310 through the power receiver 450 (e.g., the power receiver 450 of FIG. 4) in operation 620.

For example, if a ratio of a power reception amount to a power output amount is greater than or equal to a designated ratio value, the power transmitting device 310 may identify that there is no metallic foreign object in an upper portion thereof, and may not transmit a signal for enabling the electronic device 320 to enter an wireless charging protection mode to the electronic device 320. As the electronic device 320 does not receive a signal related to a wireless charging protection mode from the power transmitting device 310, the electronic device 320 may not enter a wireless charging protection mode.

For another example, if it is identified that a ratio of a power reception amount to a power output amount is less than a designated ratio value, a metallic foreign object exists in an upper part of the power transmitting device 310, but the power transmitting device 310 may not transmit a signal for enabling the electronic device 320 to enter a wireless charging protection mode to the electronic device 320. For example, when the power transmitting device 310 is a device in which a foreign object detection (FOD) function is not implemented, a metallic foreign object exists in an upper part of the power transmitting device 310, but the power transmitting device 310 does not recognize a presence of a metallic foreign object, and may not transmit a signal for enabling the electronic device 320 to enter a wireless charging protection mode to the electronic device 320. In this case, as the electronic device 320 does not receive a signal related to a wireless charging protection mode from the power transmitting device 310, the electronic device 320 may not enter a wireless charging protection mode.

In various embodiments of the disclosure, a metallic foreign object exists in an upper part of the power transmitting device 310, but when the power transmitting device 310 does not recognize this and does not transmit a signal for enabling the electronic device 320 to enter a wireless charging protection mode to the electronic device 320, thermal deformation may occur in a rear cover of the electronic device 320 and/or an upper part of the power transmitting device 310 in contact with the metallic foreign object due to heat generation in the metallic foreign object. To prevent this, the electronic device 320 may identify whether a metallic foreign object exists in an upper part of the power transmitting device 310 through operations 630 to 640 to be described later.

In an embodiment of the disclosure, in operation 625, the electronic device 320 may charge the battery 453 using power in the first range. In operation 630, the electronic device 320 may identify a charge amount of the battery 453 (e.g., a capacity (e.g., state of charge (SOC)) of the battery 453) charged for a designated time. For example, the electronic device 320 may identify a charge amount of the battery 453 charged for a designated time from a time point of charging the battery 453 using power in the first range. In operation 635, the electronic device 320 may identify whether the identified charge amount of the battery 453 is less than a designated value. If it is identified that the identified charge amount of the battery 453 is less than a designated value (e.g., YES in operation 635), the electronic device 320 may identify that a metallic foreign object exists in operation 640, and change a heat generation control condition related to a temperature of the power receiving coil (e.g., the power receiving coil 451 of FIG. 4).

In an embodiment of the disclosure, the heat generation control condition is a condition for entering a heat generation control mode, and may be related to a temperature of the power receiving coil 451. For example, the heat generation control mode is a mode of charging the battery 453 with power lower than designated power (e.g., power in a lower range than power in a designated range), and when a temperature of the power receiving coil 451 exceeds a designated temperature, the electronic device 320 may enter the heat generation control mode. The designated temperature may be a temperature that may affect a charging operation due to over temperature of the battery 453 during the wireless charging operation.

Operation 640 according to various embodiments of the disclosure may be an operation of changing the heat generation control condition from the first temperature to a second temperature lower than the first temperature, if it is identified that a charge amount of the battery 453 is less than a designated value, when a temperature of the power receiving coil 451 is configured to a first temperature (e.g., designated temperature) as the heat generation control condition.

In an embodiment of the disclosure, when it is identified that a charge amount of the battery 453 is greater than or equal to a designated value (e.g., NO in operation 635), the electronic device 320 may perform an operation of charging the battery 453 using power in the first range received from the power transmitting device 310 in operation 620.

In an embodiment of the disclosure, the electronic device 320 may identify a temperature of the power receiving coil 451 in operation 645. For example, the electronic device 320 may include a temperature sensor (e.g., the temperature sensor 440 of FIG. 4) disposed adjacent to the power receiving coil 451. The electronic device 320 may measure a temperature of the power receiving coil 451 using the temperature sensor 440 at designated time intervals.

In an embodiment of the disclosure, in operation 650, the electronic device 320 may identify whether a temperature of the power receiving coil 451 exceeds a temperature (e.g., second temperature) configured as a changed heat generation control condition. When it is identified that the identified temperature of the power receiving coil 451 exceeds a temperature (e.g., second temperature) configured as the changed heat generation control condition (e.g., YES in operation 650), the electronic device 320 may transmit a signal for requesting power in a second range lower than power in the first range to the power transmitting device 310 in operation 655. For example, the electronic device 320 may transmit a CEP signal including information for requesting power in a second range lower than power in the first range to the power transmitting device 310. The power transmitting device 310 may wirelessly transmit power in the second range to the electronic device 320 based on receiving the CEP signal including information requesting power in the second range from the electronic device 320. In operation 660, the electronic device 320 may wirelessly receive power in the second range from the power transmitting device 310 through the power receiver 450 and charge the battery 453 using power in the second range in operation 665.

In an embodiment of the disclosure, if it is not identified that the identified temperature of the power receiving coil 451 exceeds a temperature (e.g., second temperature) configured as the changed heat generation control condition (e.g., NO in operation 650), the electronic device 320 may perform an operation of charging the battery 453 using power in the first range received from the power transmitting device 310 in operation 620.

In various embodiments of the disclosure, although not illustrated, the electronic device 320 may charge the battery 453 using power in the second range in operation 665, and measure a temperature of the power receiving coil 451 using the temperature sensor 440 at designated time intervals. When the measured temperature of the power receiving coil 451 becomes a temperature (e.g., third temperature) lower than a temperature (e.g., second temperature) configured as the changed heat generation control condition, the electronic device 320 may transmit a signal for requesting power in a first range higher than power in a second range to the power transmitting device 310. The electronic device 320 may charge the battery 453 using power in a first range wirelessly received from the power transmitting device 310 through the power receiving coil 451.

A method of controlling wireless charging of the electronic device 320 according to various embodiments may include an operation of identifying whether a wireless charging protection mode has been entered, an operation of wirelessly receiving power in a first range from the power transmitting device 310 through the power receiver 450 of the electronic device 320 when it is identified that a wireless charging protection mode has not been entered, an operation of charging the battery 453 using power in the first range and identifying a charge amount of the battery 453 charged for a designated time, and an operation of identifying that a metallic foreign object exists and changing the heat generation control condition when it is identified that the charge amount of the battery 453 is less than a designated value.

In various embodiments of the disclosure, the heat generation control condition may be related to a temperature of the power receiving coil 451.

In various embodiments of the disclosure, the operation of changing the heat generation control condition may include an operation of changing the heat generation control condition from the first temperature to a second temperature lower than the first temperature, if it is identified that the identified charge amount of the battery 453 is less than the designated value, when the temperature of the power receiving coil 451 is configured to a first temperature as the heat generation control condition.

A method of controlling wireless charging of an electronic device 320 according to various embodiments may further include an operation of measuring a temperature of the power receiving coil 451 using the temperature sensor 440 of the electronic device 320, an operation of transmitting a signal requesting power in a second range lower than power in the first range to the power transmitting device 310 when the measured temperature of the power receiving coil 451 exceeds the second temperature, and an operation of charging the battery 453 using power in the second range wirelessly received from the power transmitting device 310 through the power receiver 450.

A method of controlling wireless charging of the electronic device 320 according to various embodiments may further include an operation of transmitting a signal requesting power in a first range higher than power in the second range to the power transmitting device 310, and an operation of charging the battery 453 using power in the first range wirelessly received from the power transmitting device 310 through the power receiver 450 when a temperature of the power receiving coil 451 measured through the temperature sensor 440 reaches a third temperature lower than the second temperature while the battery 453 is being charged using power in the second range.

In various embodiments of the disclosure, the operation of identifying whether a wireless charging protection mode has been entered may include an operation of receiving a signal for enabling to enter a wireless charging protection mode determined by the power transmitting device 310 from the power transmitting device 310 based on an output amount of power transmitted by the power transmitting device 310 and a reception amount of power received from the power transmitting device 310.

A method of controlling wireless charging of the electronic device 320 according to various embodiments may further include an operation of receiving a signal for enabling to enter a wireless charging protection mode from the power transmitting device 310, and an operation of entering a wireless charging protection mode to block charging of the battery 453 based on it being identified by the power transmitting device 310 that a ratio of a power reception amount to a power output amount is less than a designated ratio value.

In various embodiments of the disclosure, when a ratio of the power reception amount to the power output amount is less than the designated ratio value, the metallic foreign object may exist in an upper part of the power transmitting device 310.

In various embodiments of the disclosure, the operation of wirelessly receiving power in the first range may include an operation of wirelessly receiving power in the first range from the power transmitting device 310 through the power receiver 450 when not receiving a signal for enabling to enter a wireless charging protection mode from the power transmitting device 310.

In various embodiments of the disclosure, a case of not receiving a signal for enabling to enter a wireless charging protection mode from the power transmitting device 310 may include a case of not receiving a signal for enabling to enter a wireless charging protection mode from the power transmitting device 310 based on it being identified by the power transmitting device 310 that a ratio of the power reception amount to the power output amount is greater than or equal to the designated ratio value.

In various embodiments of the disclosure, when a ratio of the power reception amount to the power output amount is equal to or greater than the designated ratio value, the metallic foreign object may not exist in an upper part of the power transmitting device 310.

In various embodiments of the disclosure, a case of not receiving a signal for enabling to enter a wireless charging protection mode from the power transmitting device 310 may include a case of not receiving a signal for enabling to enter a wireless charging protection mode from the power transmitting device 310, as a presence of the metallic foreign object is not recognized, but a metallic foreign object exists in an upper part of the power transmitting device 310 based on it being identified by the power transmitting device 310 that a ratio of the power reception amount to the power output amount is less than the designated ratio value.

Figure 7A:
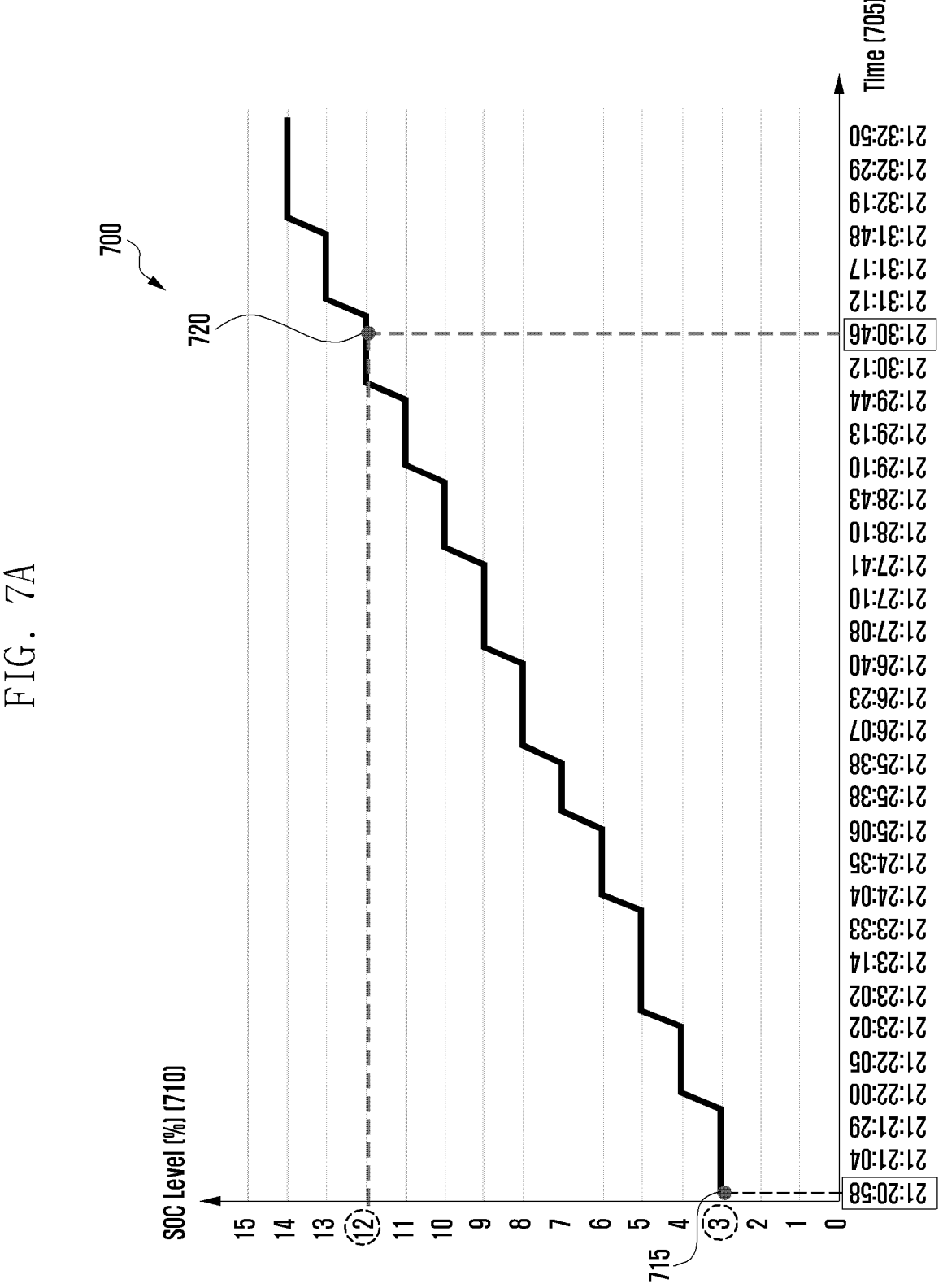
FIGS. 7A and 7B are graphs illustrating a method of identifying whether a metallic foreign object exists in an upper part of a power transmitting device based on a charge amount of a battery according to various embodiments of the disclosure.
Figure 7B:
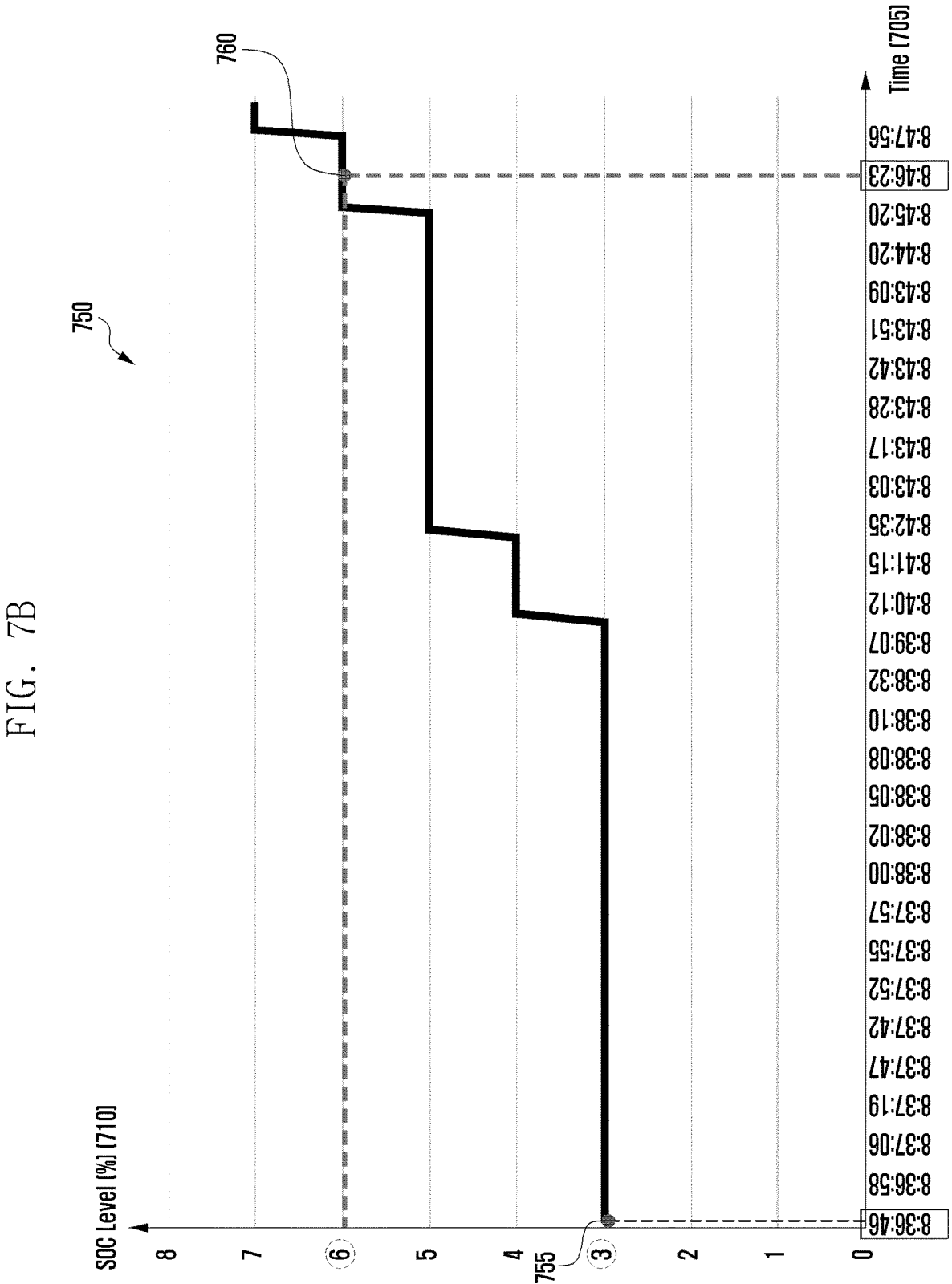

FIGS. 7A and 7B are graphs 700 and 750 illustrating a method of identifying whether a metallic foreign object exists in an upper part of a power transmitting device based on a charge amount of a battery according to various embodiments of the disclosure.

In various embodiments of the disclosure, a metallic foreign object exists in an upper part of the power transmitting device (e.g., the power transmitting device 310 of FIGS. 3A and 3B), but the power transmitting device 310 does not recognize this and may not transmit a signal for enabling the electronic device (e.g., the electronic device 320 of FIGS. 3A and 3B) to enter a wireless charging protection mode to the electronic device 320. In this case, thermal deformation may occur in a rear cover of the electronic device 320 and/or an upper part of the power transmitting device 310 in contact with the metallic foreign object due to heat generation of the metallic foreign object. To prevent this, the electronic device 320 may identify whether a metallic foreign object exists in the upper part of the power transmitting device 310 based on a charge amount of the battery 453 according to FIGS. 7A and 7B.

FIG. 7A according to various embodiments is a graph 700 illustrating a case in which a charge amount of a battery (e.g., the battery 453 of FIG. 4) exceeds a designated value, and FIG. 7B is a diagram 750 illustrating a case in which a charge amount of the battery 453 is less than or equal to a designated value.

Referring to FIGS. 7A and 7B, it is assumed that a designated time is 10 minutes and that a designated value is about 4.5%.

With reference to FIG. 7A, an x-axis may mean a time 705, and a y-axis may mean a charge amount of the battery 453, for example, an SOC level 710.

In various embodiments of the disclosure, the electronic device 320 may receive wirelessly power in the first range from the power transmitting device 310 through the power receiver (e.g., the power receiver 450 of FIG. 4) in a state that does not enter a wireless charging protection mode.

In an embodiment of the disclosure, the electronic device 320 may identify a charge amount of the battery 453 charged for a designated time from a time point that charges the battery 453 using power in the first range. For example, the electronic device 320 may identify a charge amount of the battery 453 from a time point that charges the battery 453 using power in the first range to a time point 720 at which 10 minutes have elapsed. As illustrated in FIG. 7A, an SOC level 710 at a time point 715 that charges the battery 453 using power in the first range may be about 3%, and an SOC level 710 at a time point 720 at which 10 minutes has elapsed may be about 12%. A charge amount of the battery 453 charged for 10 minutes is about 9%, and the electronic device 320 may identify that a charge amount (e.g., about 9%) of the battery 453 for 10 minutes exceeds a designated value (e.g., about 4.5%). The electronic device 320 may charge the battery 453 using power in the first range based on it being identified that a charge amount (e.g., about 9%) of the battery 453 for 10 minutes exceeds a designated value (e.g., about 4.5%). For example, the electronic device 320 may determine that there is no metallic foreign object in the upper part of the power transmitting device 310 and charge the battery 453 using power in the first range based on it being identified that a charge amount (e.g., about 9%) of the battery 453 for 10 minutes exceeds a designated value (e.g., about 4.5%).

With reference to FIG. 7B, an x-axis may mean a time 705, and a y-axis may mean a charge amount of the battery 453, for example, an SOC level 710.

In various embodiments of the disclosure, the electronic device 320 may wirelessly receive power in a first range from the power transmitting device 310 through the power receiver 450 in a state in which a wireless charging protection mode has not been entered.

In an embodiment of the disclosure, the electronic device 320 may identify a charge amount of the battery 453 charged for a designated time from a time point that charges the battery 453 using power in the first range. For example, the electronic device 320 may identify a charge amount of the battery 453 from a time point 755 that charges the battery 453 using power in the first range to a time point 760 at which 10 minutes have elapsed. As illustrated in FIG. 7B, an SOC level 710 at the time point 755 that charges the battery 453 using power in the first range may be about 3%, and an SOC level 710 at a time point 760 at which 10 minutes has elapsed may be about 6%. A charge amount of the battery 453 charged for 10 minutes is about 3%, and the electronic device 320 may identify that a charge amount (e.g., about 3%) of the battery 453 for 10 minutes is lower than or equal to a designated value (e.g., about 4.5%). The electronic device 320 may change a heat generation control condition related to a temperature of the power receiving coil (e.g., the power receiving coil of FIG. 4) based on it being identified that a charge amount (e.g., about 3%) of the battery 453 for 10 minutes is lower than or equal to a designated value (e.g., about 4.5%).

For example, the electronic device 320 may determine that a metallic foreign object exists in an upper part of the power transmitting device 310 and change a heat generation control condition related to a temperature of the power receiving coil 451 based on it being identified that a charge amount (e.g., about 3%) of the battery 453 for 10 minutes is less than or equal to a designated value (e.g., about 4.5%).

Because an operation and subsequent operations of changing the heat generation control condition related to a temperature of the power receiving coil 451 according to various embodiments are the same as operations 640 to 665 of FIG. 6 described above, a description thereof may be replaced with a description of FIG. 6.

Figure 8:
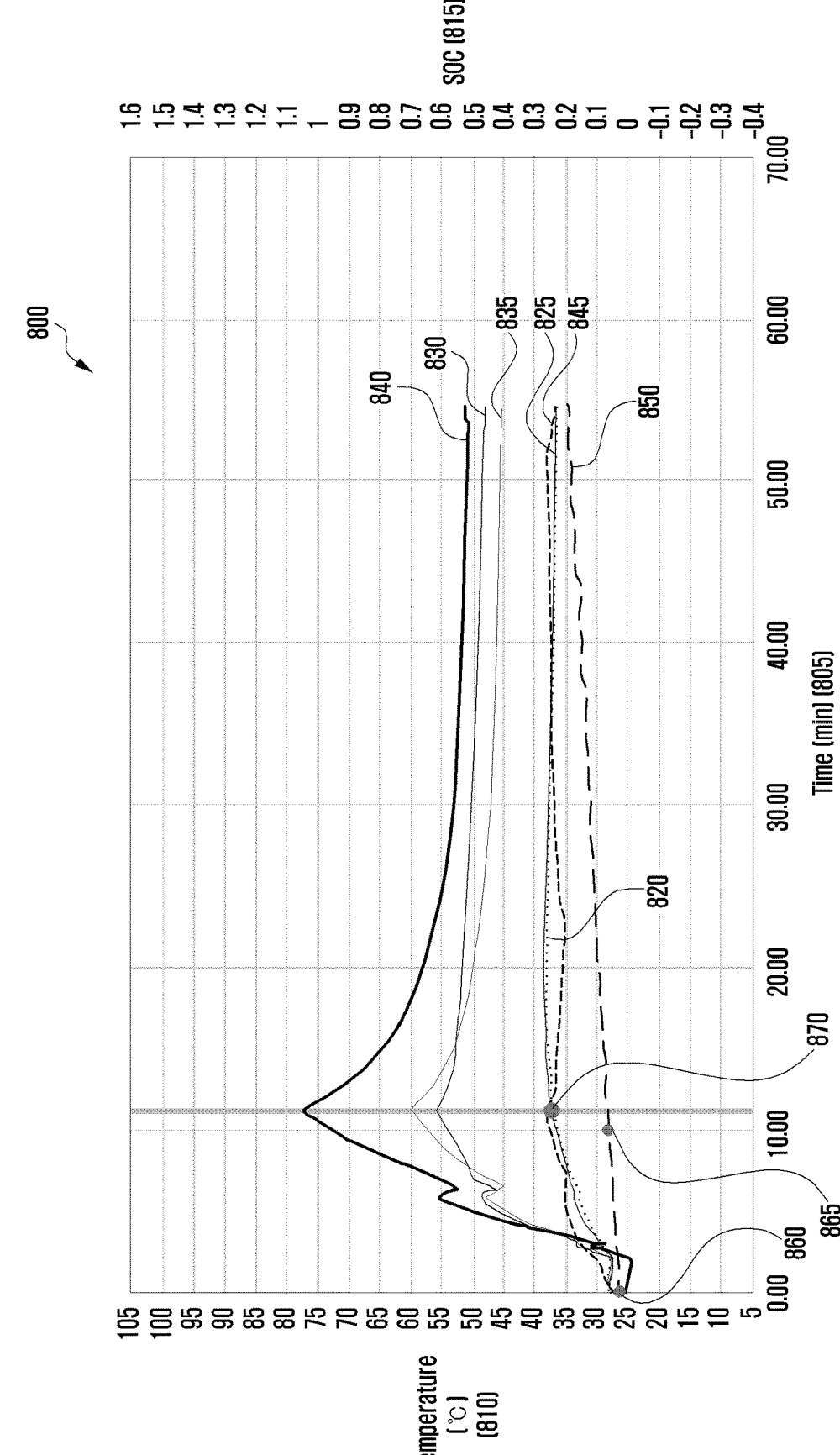
FIG. 8 is a graph illustrating a method of charging a battery after changing a heat generation control condition related to a temperature of a power receiving coil based on a presence of a metallic foreign object in an upper part of a power transmitting device according to an embodiment of the disclosure.

FIG. 8 is a graph 800 illustrating a method of charging a battery after changing a heat generation control condition related to a temperature of a power receiving coil based on a presence of a metallic foreign object in an upper part of the power transmitting device according to an embodiment of the disclosure.

Referring to FIG. 8, a graph 820 according to various embodiments of the disclosure, may be a graph representing a temperature 810 of a battery (e.g., the battery 453 of FIG. 4) according to a time 805, a graph 825 may be a graph representing a temperature 810 of a position corresponding to a position of a metallic foreign object of the battery 453 according to a time 805, a graph 830 may be a graph representing a temperature 810 of a position in contact with a metallic foreign object in a power receiving coil (e.g., the power receiving coil 451 of FIG. 4) according to a time 805, a graph 835 may be a graph representing a temperature 810 of a position corresponding to a position of a metallic foreign object in a rear cover (not illustrated) of an electronic device (e.g., the electronic device 320 of FIGS. 3A and 3B) according to a time 805, and a graph 840 may be a graph representing a temperature 810 of a position in which a metallic foreign object exists in an upper part of the power transmitting device (e.g., the power transmitting device 310 of FIGS. 3A and 3B) according to a time 805. A graph 845 of FIG. 8 may be a graph representing a temperature 810 of the power receiving coil 451 according to a time 805, and a graph 850 may be a graph representing a charge amount of the battery 453, for example, a state of charge (SOC) 815 according to a time 805.

With reference to FIG. 8, the electronic device 320 may identify whether a charge amount 815 of the battery 453 charged for a designated time using power in a first range is less than a designated value. For example, the electronic device 320 may identify that a charge amount of the battery 453 charged for a designated time (e.g., 10 minutes 865) from a time point 860 that charges the battery 453 using power in a first range is less than a value designated as about 3%, for example, about 4.5% based on a graph 850 representing a charge amount, for example, an SOC 815 of the battery 453 according to a time 805. The electronic device 320 may determine that a metallic foreign object exists in an upper part of the power transmitting device 310 and change a heat generation control condition related to a temperature of the power receiving coil 451 based on it being identified that the charge amount (e.g., about 3%) of the charged battery 453 is less than a designated value (e.g., about 4.5%). For example, when a temperature of the power receiving coil 451 is configured to a first temperature (e.g., designated temperature) as a heat generation control condition, if it is identified that a charge amount of the battery 453 is less than a designated value, the electronic device 320 may change the heat generation control condition from the first temperature to a second temperature lower than the first temperature.

Referring to FIG. 8, it is assumed that the first temperature is about 41 degrees and the second temperature is about 38 degrees.

In an embodiment of the disclosure, the electronic device 320 may measure a temperature of the power receiving coil 451 at designated time intervals using a temperature sensor (e.g., the temperature sensor 440 of FIG. 4) disposed adjacent to the power receiving coil 451.

In an embodiment of the disclosure, the electronic device 320 may identify whether a temperature of the power receiving coil 451 exceeds a temperature, for example, about 38 degrees (e.g., second temperature) configured as the changed heat generation condition based on a graph 845 representing a temperature 810 of the power receiving coil 451 according to a time 805. When it is identified that a temperature 870 of the power receiving coil 451 exceeds a temperature, for example, about 38 degrees (e.g., second temperature) configured as the changed heat generation control condition, the electronic device 320 may transmit a signal for requesting power in a second range lower than power in the first range to the power transmitting device 310. The electronic device 320 may wirelessly receive power in the second range from the power transmitting device 310 through the power receiver 450 and charge the battery 453 using power in the second range.

In various embodiments of the disclosure, although not illustrated, the electronic device 320 may charge the battery 453 using power in the second range and measure a temperature of the power receiving coil 451 using the temperature sensor 440 at designated time intervals. When the measured temperature of the power receiving coil 451 becomes a temperature (e.g., third temperature (e.g., about 35 degrees)) lower than a temperature (e.g., second temperature (e.g., about 38 degrees)) configured as the changed heat generation control condition, the electronic device 320 may transmit a signal requesting power in the first range higher than power in the second range to the power transmitting device 310. The electronic device 320 may charge the battery 453 using power in a first range wirelessly received from the power transmitting device 310 through the power receiver 450.

In various embodiments of the disclosure, the rear cover of the electronic device 320 may be made of glastic, and a thermal deformation start temperature of the glastic may be, for example, about 80 degrees.

In various embodiments of the disclosure, based on that the temperature 810 of the power receiving coil 451 reaches 870 a temperature, for example, about 38 degrees (e.g., second temperature) configured as the changed heat generation control condition, as the battery 453 is charged using power in the second range lower than power in the first range, a temperature (e.g., a temperature of the battery 453, a temperature of a position corresponding to a position of a metallic foreign object of the battery 453, a temperature of a position in contact with the metallic foreign material in the power receiving coil 451, a temperature 810 of a position corresponding to a position of a metallic foreign object in a rear cover (not illustrated) of the electronic device 320, and a temperature of a position in which a metallic foreign object exists in an upper part of the power transmitting device 310) according to graphs 820, 825, 830, 835, and 840 at a subsequent time and a time point at which the temperature 810 of the power receiving coil 451 reaches 870 a temperature, for example, about 38 degrees (e.g., second temperature) configured as the changed heat generation control condition may be lower than about 80 degrees (e.g., a thermal deformation start temperature of the rear cover of the electronic device 320). Accordingly, it is possible to prevent or reduce thermal deformation that may occur in the rear cover of the electronic device 320 and/or the upper part of the power transmitting device 310.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a power receiver including a power receiving coil;
   a battery; and
   at least one processor operatively connected to the power receiver and the battery,
   wherein the at least one processor is configured to:
      wirelessly receive power in a first range from a power transmitting device through the power receiver,
      charge the battery using power in the first range and identify a charge amount of the battery charged for a designated time,
      identify presence of a metallic foreign object based on the identified charge amount of the battery being less than a designated value, and
      change a heat generation control condition based on the identification of the presence of the metallic foreign object,
   wherein the heat generation control condition comprises a case where a temperature of the power receiving coil is configured to a first temperature, and
   wherein the at least one processor is configured to:
      change the heat generation control condition from the first temperature to a second temperature lower than the first temperature, based on the identified charge amount of the battery being less than the designated value.

2. The electronic device of claim 1, further comprising a temperature sensor disposed adjacent to the power receiving coil,
   wherein the at least one processor is further configured to:
      transmit a signal requesting power in a second range lower than power in the first range to the power transmitting device based on the temperature of the power receiving coil measured through the temperature sensor exceeding the second temperature, and
      charge the battery using power in the second range wirelessly received from the power transmitting device through the power receiver.

3. The electronic device of claim 2, wherein the at least one processor is further configured to:
   transmit the signal requesting power in the first range higher than power in the second range to the power transmitting device, in case that the temperature of the power receiving coil measured through the temperature sensor reaches a third temperature lower than the second temperature while charging the battery using power in the second range, and
   charge the battery using power in the first range wirelessly received from the power transmitting device through the power receiver.

4. The electronic device of claim 1, wherein the at least one processor is further configured to receive a signal for enabling entry into a wireless charging protection mode determined by the power transmitting device from the power transmitting device based on an output amount of power transmitted by the power transmitting device and a reception amount of power received from the power transmitting device.

5. The electronic device of claim 4,
   wherein the at least one processor is further configured to:
   receive the signal for enabling entry into the wireless charging protection mode from the power transmitting device based on a ratio of the power reception amount to the power output amount being identified to be less than a designated ratio value by the power transmitting device, and
   block charging of the battery by entry into the wireless charging protection mode, and
   wherein the metallic foreign object is present in an upper part of the power transmitting device, when the ratio of the power reception amount to the power output amount is less than the designated ratio value.

6. The electronic device of claim 4, wherein the at least one processor is further configured to wirelessly receive power in the first range from the power transmitting device through the power receiver when the signal for enabling entry into the wireless charging protection mode is not received from the power transmitting device.

7. The electronic device of claim 6,
   wherein a case of not receiving the signal for enabling entry into the wireless charging protection mode from the power transmitting device comprises a case of not receiving the signal for enabling entry into the wireless charging protection mode from the power transmitting device based on the ratio of the power reception amount to the power output amount being identified as being greater than or equal to the designated ratio value by the power transmitting device, and
   wherein the metallic foreign object is not present in an upper part of the power transmitting device, in case that the ratio of the power reception amount to the power output amount is equal to or greater than the designated ratio value.

8. The electronic device of claim 6, wherein a case of not receiving the signal for enabling entry into the wireless charging protection mode from the power transmitting device comprises a case of not receiving the signal for enabling entry into the wireless charging protection mode from the power transmitting device, as the presence of the metallic foreign object is not identified, but the metallic foreign object is present in an upper part of the power transmitting device based on the ratio of the power reception amount to the power output amount being identified as being less than the designated ratio value by the power transmitting device.

9. A method of controlling wireless charging of an electronic device, the method comprising:

receiving wirelessly power in a first range from a power transmitting device through a power receiver of the electronic device;

charging a battery using power in the first range and identifying a charge amount of the battery charged for a designated time;

identifying presence of a metallic foreign object based on the identified charge amount of the battery being less than a designated value, and changing a heat generation control condition based on the identification of the presence of the metallic foreign object, wherein the heat generation control condition comprises a case where a temperature of a power receiving coil included in the power receiver is configured to a first temperature, and wherein changing the heat generation control condition comprises:

changing the heat generation control condition from the first temperature to a second temperature lower than the first temperature, based on the identified charge amount of the battery being less than the designated value.

10. The method of claim 9, further comprising:

measuring a temperature of the power receiving coil using a temperature sensor of the electronic device;

transmitting a signal requesting power in a second range lower than power in the first range to the power transmitting device in case that the measured temperature of the power receiving coil exceeds the second temperature; and charging the battery using power in the second range wirelessly received from the power transmitting device through the power receiver.

11. The method of claim 10, further comprising:

transmitting the signal requesting power in the first range higher than power in the second range to the power transmitting device, in case that the temperature of the power receiving coil measured through the temperature sensor reaches a third temperature lower than the second temperature while charging the battery using power in the second range; and charging the battery using power in the first range wirelessly received from the power transmitting device through the power receiver.

12. The method of claim 9, further comprising:

receiving a signal for enabling entry into the wireless charging protection mode determined by the power transmitting device from the power transmitting device based on an output amount of power transmitted by the power transmitting device and a reception amount of power received from the power transmitting device.

13. The method of claim 12, further comprising:

receiving the signal for enabling entry into the wireless charging protection mode from the power transmitting device based on a ratio of the power reception amount to the power output amount is being identified as being less than a designated ratio value by the power transmitting device; and entering the wireless charging protection mode to block charging of the battery, wherein the metallic foreign object is present in an upper part of the power transmitting device, when the ratio of the power reception amount to the power output amount is less than the designated ratio value.

14. The method of claim 12, wherein the receiving of wirelessly power in the first range comprises wirelessly receiving power in the first range from the power transmitting device through the power receiver in case that the signal for enabling entry into the wireless charging protection mode is not received from the power transmitting device.

15. The method of claim 14, wherein a case of not receiving the signal for enabling entry into the wireless charging protection mode from the power transmitting device comprises a case of not receiving the signal to enter the wireless charging protection mode from the power transmitting device based on the ratio of the power reception amount to the power output amount being identified as being greater than or equal to the designated ratio value by the power transmitting device, and wherein the metallic foreign object is not present in an upper part of the power transmitting device, in case that the ratio of the power reception amount to the power output amount is greater than or equal to the designated ratio value.

16. The method of claim 14, wherein a case of not receiving the signal for enabling entry into the wireless charging protection mode from the power transmitting device comprises a case of not receiving the signal for enabling entry into the wireless charging protection mode from the power transmitting device, as the presence of the metallic foreign object is not identified, but the metallic foreign object is present in an upper part of the power transmitting device based on the ratio of the power reception amount to the power output amount being identified as being less than the designated ratio value by the power transmitting device.

\* \* \* \* \*